United States Patent
Murayama

(10) Patent No.: US 11,151,429 B2
(45) Date of Patent: Oct. 19, 2021

(54) PRINTING DEVICE INCLUDING PRINTING PART PRINTING FIRST SCALE AND SECOND SCALE ON PRINTING MEDIUM AND CUTTING PART CUTTING PRINTED FIRST SCALE AND PRINTED SECOND SCALE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/834,758

(22) Filed: Mar. 30, 2020

(65) Prior Publication Data

US 2020/0410309 A1 Dec. 31, 2020

(30) Foreign Application Priority Data

Jun. 26, 2019 (JP) .............................. JP2019-118058

(51) Int. Cl.
*G06K 15/16* (2006.01)
*B41J 11/66* (2006.01)
*G06K 15/02* (2006.01)

(52) U.S. Cl.
CPC ............ *G06K 15/16* (2013.01); *B41J 11/663* (2013.01); *G06K 15/022* (2013.01); *G06K 15/028* (2013.01)

(58) Field of Classification Search
None
See application file for complete search history.

(56) References Cited

U.S. PATENT DOCUMENTS

| | | | | | |
|---|---|---|---|---|---|
| 2008/0252675 | A1* | 10/2008 | Yasutani | ................ | B41J 29/393 347/16 |
| 2015/0165792 | A1* | 6/2015 | Kudo | .................... | B26D 1/185 347/16 |
| 2017/0087910 | A1* | 3/2017 | Nagashima | ................ | B41J 2/01 |

FOREIGN PATENT DOCUMENTS

| | | |
|---|---|---|
| JP | 2003-072172 A | 3/2003 |
| JP | 2003-231315 A | 8/2003 |
| JP | 2003-231316 A | 8/2003 |
| JP | 2003-260833 A | 9/2003 |
| JP | 2003-266377 A | 9/2003 |
| JP | 2003-266831 A | 9/2003 |
| JP | 2003-266835 A | 9/2003 |
| JP | 2015-116668 A | 6/2015 |

* cited by examiner

*Primary Examiner* — Andrew H Lam
(74) *Attorney, Agent, or Firm* — Kenealy Vaidya LLP

(57) ABSTRACT

A printing device includes: a conveying part configured to convey a printing medium in a conveying direction; a printing part configured to print on the printing medium at a print timing; a cutting part provided downstream of the printing part in the conveying direction and configured to cut the printing medium, which has been conveyed by the conveying part, at a cut timing after the printing part prints on the printing medium; and the controller configured to print, by controlling the printing part, a first scale and a second scale on the printing medium. At least a portion of the printed first scale and at least a portion of the printed second scale are arranged at the same position in the conveying direction. The printed first scale and the printed second scale are arranged at different positions in an orthogonal direction orthogonal to the conveying direction.

13 Claims, 11 Drawing Sheets

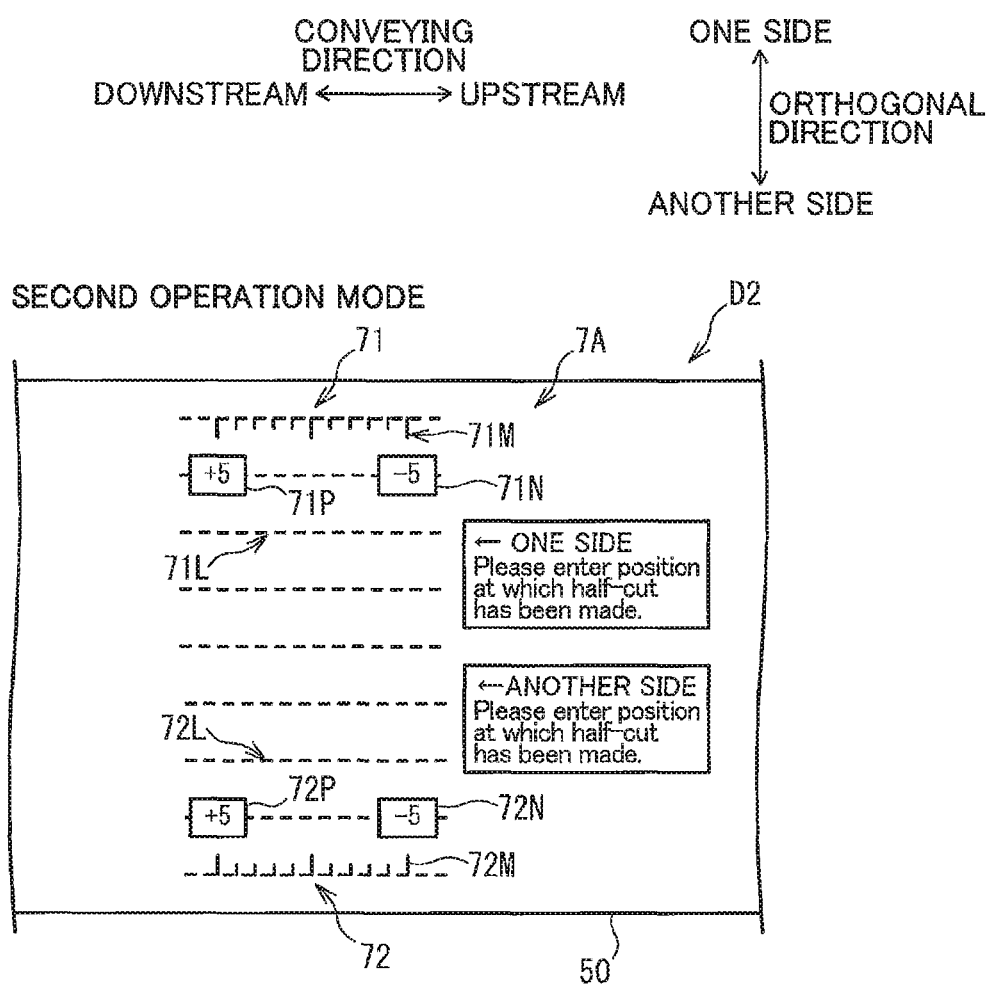

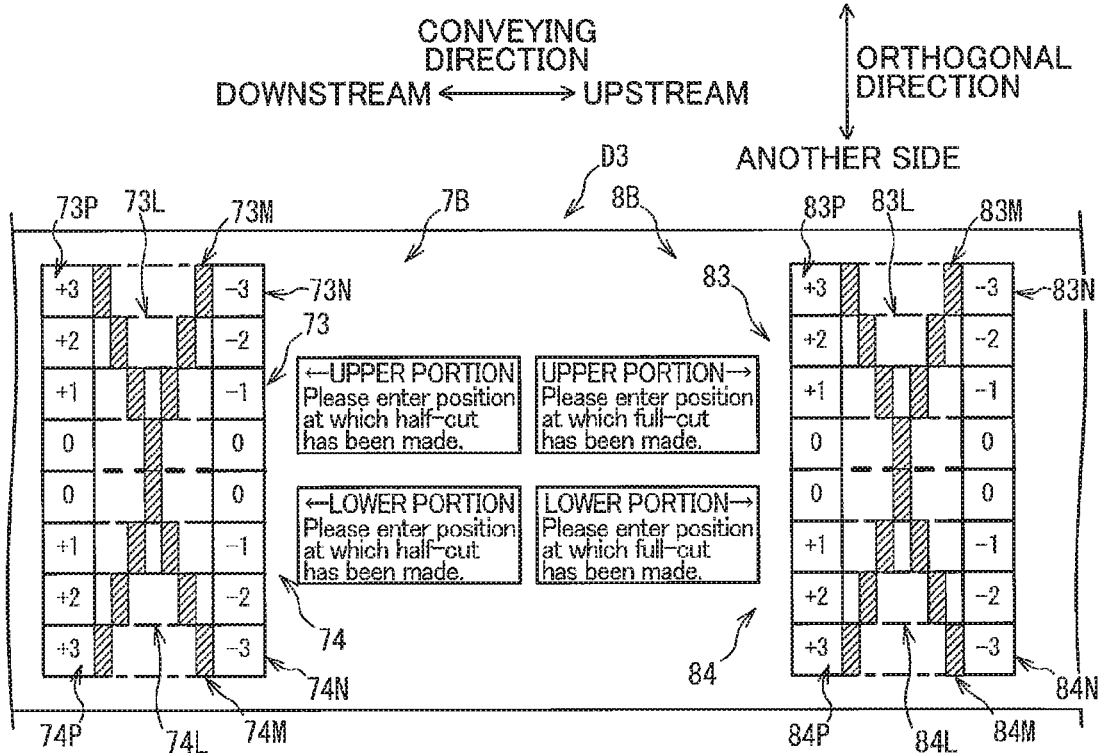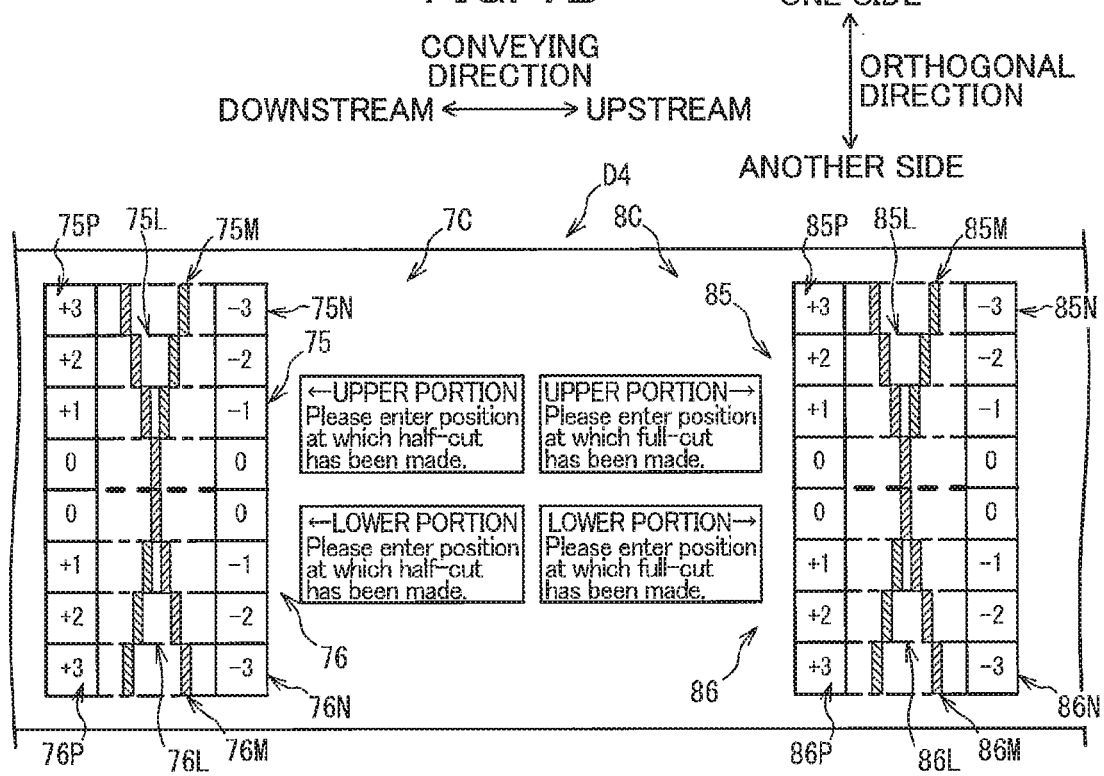

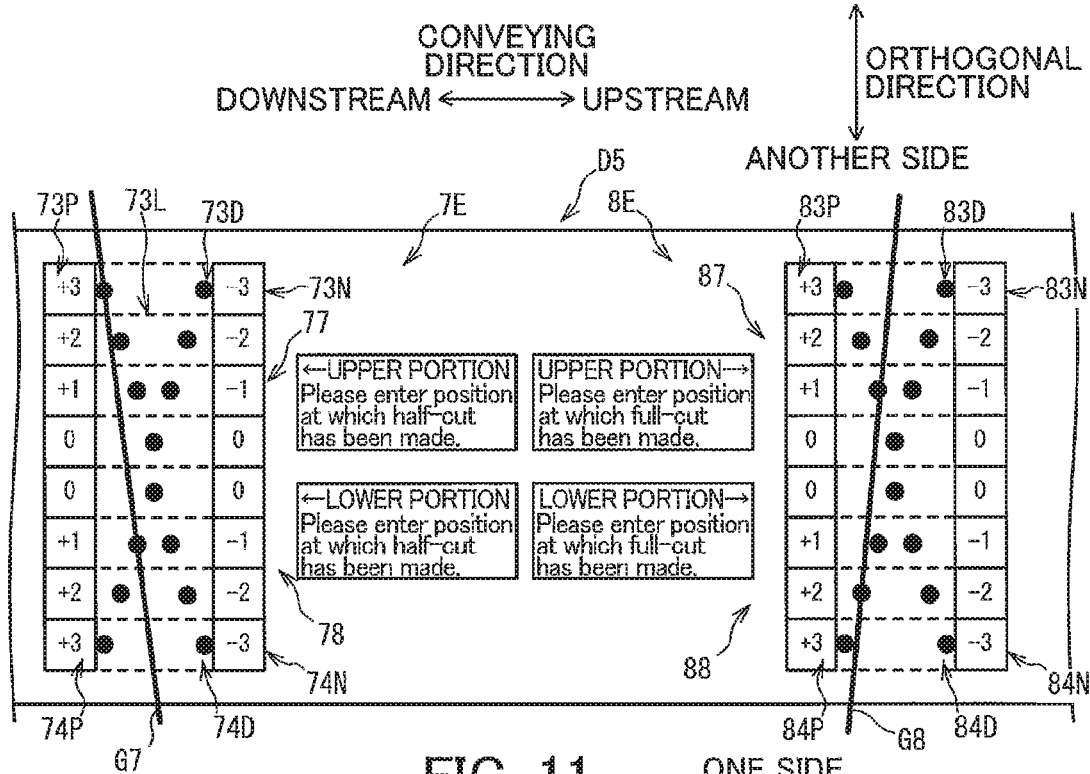
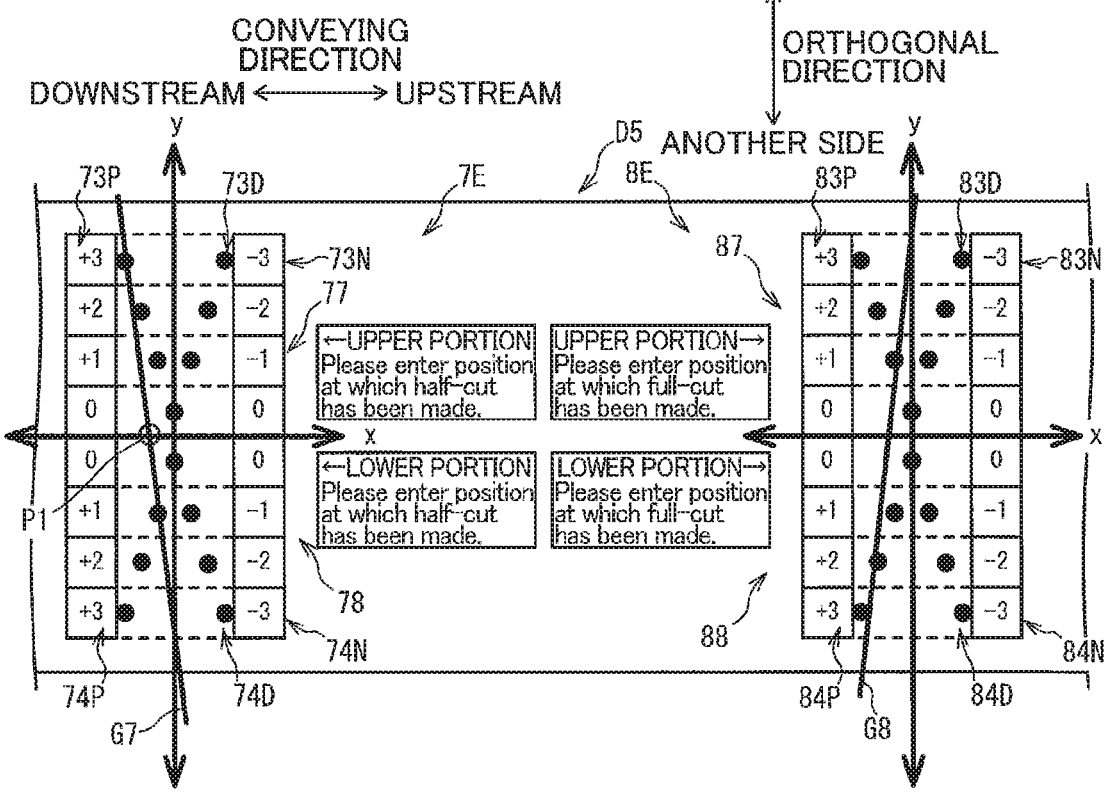

PRINTING DEVICE INCLUDING PRINTING PART PRINTING FIRST SCALE AND SECOND SCALE ON PRINTING MEDIUM AND CUTTING PART CUTTING PRINTED FIRST SCALE AND PRINTED SECOND SCALE

CROSS REFERENCE TO RELATED APPLICATION

This application claims priority from Japanese Patent Application No. 2019-118058 filed Jun. 26, 2019. The entire content of the priority application is incorporated herein by reference.

TECHNICAL FIELD

The present disclosure relates to a printing device.

BACKGROUND

There is known a printing device that performs printing on a long print medium while conveying it and can cut the print medium subjected to the printing by a cutting mechanism. In such a printing device, a designed mounting position and an actual mounting position may differ due to a dimensional error. In this case, an actual cut position may be deviated from a cut position set in the printer. To cope with this, there is proposed a technique for correcting the deviation of the cut position.

Japanese Patent Application Publication No. 2003-231316A discloses a printer that can perform printing on a rolled paper sheet. This printer is provided with a cutter for cutting a printed portion of the rolled paper sheet. In order to cut a position coinciding with a print end position by the cutter, the printer corrects the cut position by the following method.

The printer prints, on a rolled paper sheet, a pattern including a plurality of squares arranged in the main scanning direction, numerals assigned to the respective squares, borders extending in the main scanning direction inside the respective squares. The area ratio of two parts divided by the border in each square differs for every square.

The printer cuts the rolled paper sheet by the cutter after printing the pattern. A user identifies a numeral corresponding to a square including the border coinciding with the cut position by the cutter as adjustment data and inputs it to a host computer. The host computer calculates a correction value based on the input adjustment data and transmits it to the printer. The printer determines a feed amount of the rolled paper sheet based on the received correction value. Thus, the printer can correct variation in the mounting position of the cutter and cut the rolled paper sheet at a position coinciding with the print end position.

SUMMARY

Cutting performed by a cutting mechanism may be inclined with respect to a direction orthogonal to the conveying direction of a print medium. In this case, when the cut position is corrected by the method described in JP 2003-231316A, the adjustment data may vary in accordance with the inclination direction of the cut position or inclination angle thereof. Thus, there may be a case where a cut position set in a printing device and an actual cut position cannot be made to accurately coincide with each other.

In view of the foregoing, it is an object of the present disclosure to provide a printing device capable of making a set cut position and an actual cut position accurately coincide with each other even when cutting performed by a cutting mechanism is inclined with respect to a direction orthogonal to the conveying direction of a print medium.

In order to attain the above and other objects, according to one aspect, the disclosure provides a printing device including: a conveying part, a printing part, a cutting part, a memory, and a controller. The conveying part is configured to convey a printing medium in a conveying direction. The printing part is configured to print on the printing medium at a print timing. The cutting part is provided downstream of the printing part in the conveying direction. The cutting part is configured to cut the printing medium, which has been conveyed by the conveying part, at a cut timing after the printing part prints on the printing medium. The memory stores a set of program instructions. The controller is configured to execute the set of program instructions stored in the memory. The set of program instructions, when executed by the controller, causes the controller to perform: (a) printing, by controlling the printing part, a first scale and a second scale on the printing medium. At least a portion of the printed first scale and at least a portion of the printed second scale are arranged at the same position in the conveying direction. The printed first scale and the printed second scale are arranged at different positions in an orthogonal direction orthogonal to the conveying direction.

BRIEF DESCRIPTION OF THE DRAWINGS

The particular features and advantages of the embodiment(s) as well as other objects will become apparent from the following description taken in connection with the accompanying drawings, in which:

FIG. 4C is a view illustrating the scale group D2 printed on the tape 50 by the printing device 1 according to the first embodiment;

FIG. 7A is a view illustrating a scale group D3 printed on a tape 50 by a printing device 1 according to a second embodiment of the present disclosure;

FIG. 7B is a view illustrating a scale group D4 printed on the tape 50 by the printing device 1 according to the second embodiment;

FIG. 10 is a view illustrating a scale group D5 printed on a tape 50 by a printing device 1 according to a third embodiment of the present disclosure;

FIG. 11 is a view for describing how to specify a half-cut timing in the printing device 1 according to the third embodiment

DETAILED DESCRIPTION

Next, embodiments of the present disclosure will be described while referring to FIGS. 1 through 11.

First Embodiment

Figure 1:
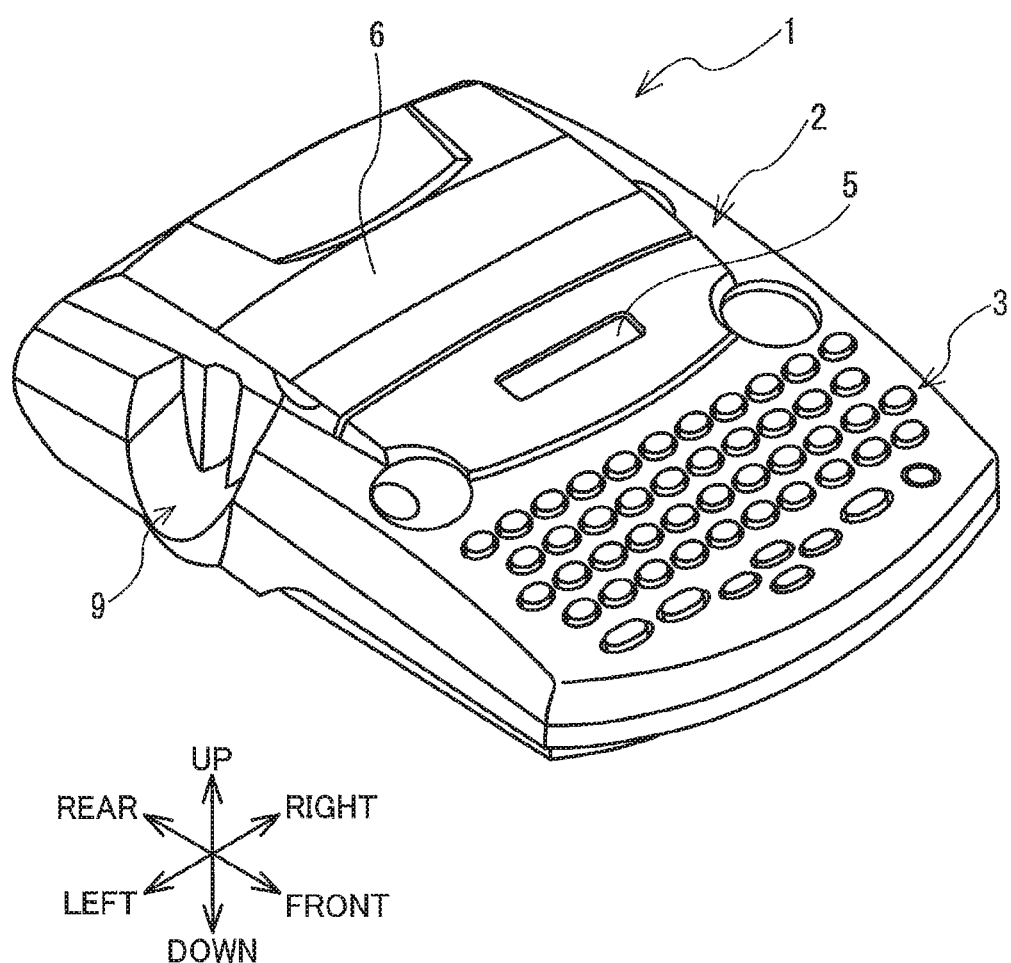
FIG. 1 is a perspective view of a printing device 1 according to a first embodiment of the present disclosure.
Figure 2:
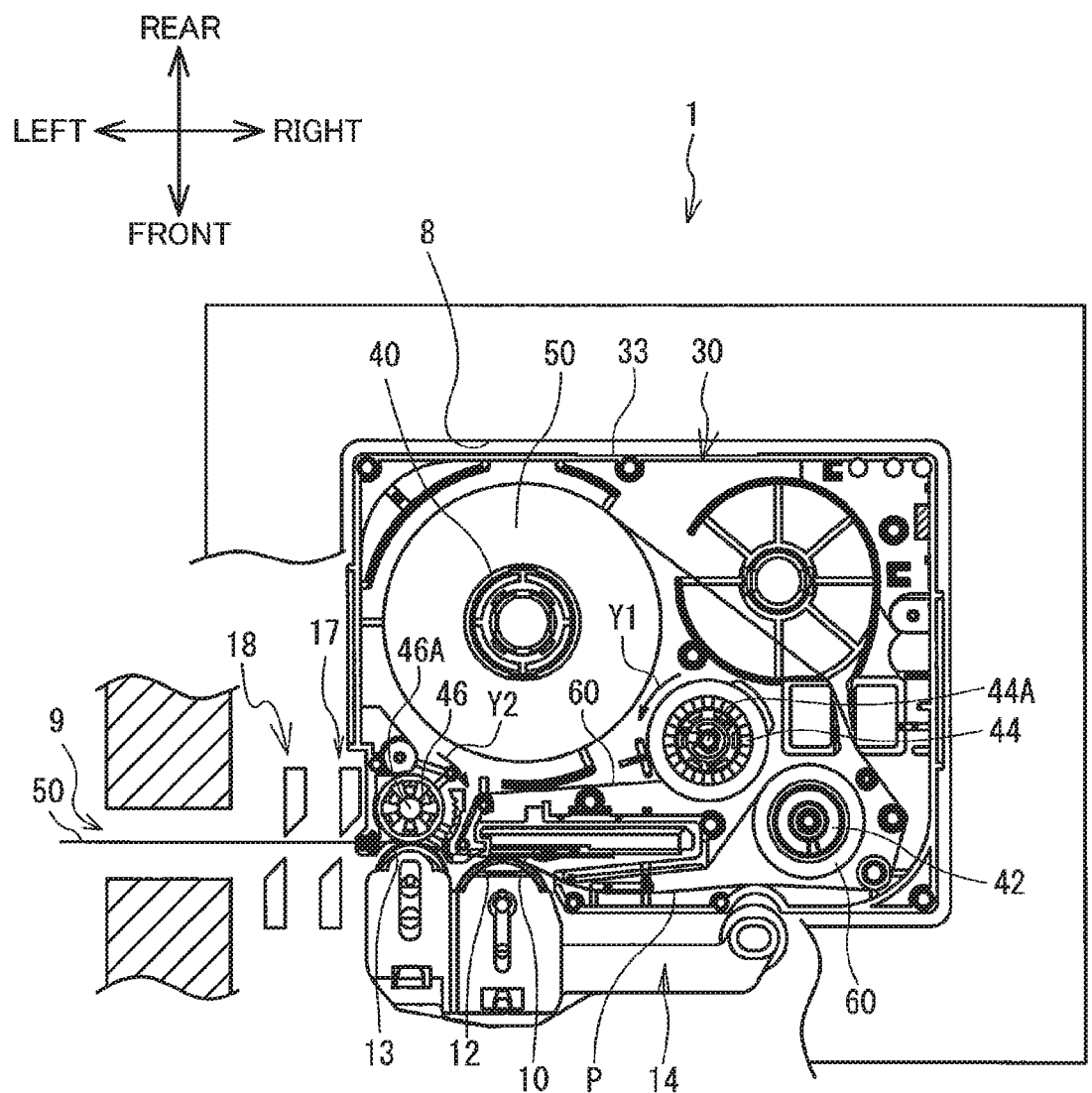
FIG. 2 is a plan view schematically illustrating the internal structure of the printing device 1 according to the first embodiment.

A first embodiment of the present disclosure will be described while referring to FIGS. 1 through 6. FIG. 1 is a perspective view of a printing device 1 according to the first embodiment of the present disclosure. FIG. 2 is a plan view schematically illustrating the internal structure of the printing device 1.

<Overview of the Printing Device 1>

The printing device 1 can create labels by printing objects on a tape 50 (see FIG. 2) that is a printing medium. Examples of the objects include letters, symbols, numbers, and other characters and character strings, as well as graphics and emojis. In the following description, the upper-right side, the lower-left side, lower-right side, upper-left side, top side, and bottom side in FIG. 1 will define the right side, left side, front side, rear side, top side, and bottom side of the printing device 1, respectively.

As shown in FIG. 1, the printing device 1 is provided with a body cover 2. The body cover 2 is the housing of the printing device 1 and has a rectangular parallelepiped shape. A keyboard 3 for inputting character strings and the like is disposed on the top surface of the body cover 2 in the front portion thereof. The keyboard 3 includes a power switch, function keys, arrow keys, and the like. A display 5 is provided in the top surface of the body cover 2 to the rear side of the keyboard 3. The display 5 displays various information. A cassette cover 6 is provided on the rear side of the display 5. The cassette cover 6 can be opened and closed relative to the body cover 2. A discharge opening 9 is formed in the rear portion of the left side surface of the body cover 2. A printed section of the tape 50 is discharged from the body cover 2 through the discharge opening 9.

As shown in FIG. 2, a cassette mounting section 8 is provided inside the body cover 2 below the cassette cover 6 (see FIG. 1). The cassette mounting section 8 is a recessed part having a shape that corresponds to the shape of a tape cassette 30. The tape cassette 30 can be mounted in and removed from the cassette mounting section 8. The printing device 1 prints an object inputted via the keyboard 3 using the tape cassette 30 mounted in the cassette mounting section 8.

The tape cassette 30 is provided with a box-shaped cassette case 33 for accommodating a tape 50, an ink ribbon 60, and the like. The tape 50 is formed of a base material and a release paper. The release paper is bonded to the base material with adhesive and laminated on one side surface of the base material. The unprinted tape 50 is wound around a tape spool 40. The tape spool 40 is rotatably supported in the left-rear section of the cassette case 33. The unused ink ribbon 60 is wound about a ribbon spool 42. The ribbon spool 42 is rotatably supported in the right-front section of the cassette case 33. A ribbon take-up spool 44 is rotatably supported in the cassette case 33 between the tape spool 40 and ribbon spool 42. The ribbon take-up spool 44 draws the unused ink ribbon 60 off the ribbon spool 42 and takes up the ink ribbon 60 after the ink ribbon 60 has been used for printing. A tape drive roller 46 is rotatably supported in the left-front corner of the cassette case 33. The tape drive roller 46 draws the unprinted tape 50 off the tape spool 40. Thus, the tape 50 is conveyed along a prescribed conveying path P. Hereinafter, the direction in which the tape 50 is conveyed along the conveying path P will be called the conveying direction. The side of the conveying path P near the tape spool 40 will be called the upstream side in the conveying direction, and the side of the conveying path P opposite the upstream side will be called the downstream side.

Also provided in the cassette mounting section 8 are a ribbon take-up shaft 44A, a tape drive shaft 46A, a thermal head 10, a retaining arm 14, and the like. The ribbon take-up shaft 44A is inserted into the ribbon take-up spool 44 and is rotated by the drive of a tape feed motor 23 (see FIG. 3). The tape drive shaft 46A is inserted into the tape drive roller 46 and is rotated through a transmission mechanism (not shown) by the drive of the tape feed motor 23. The thermal head 10 is disposed on the right side of the tape drive shaft 46A. The printing device 1 prints on the tape 50 using the unused ink ribbon 60 by causing heat-generating elements in the thermal head 10 to generate heat.

The retaining arm 14 extends in the left-right direction and is pivotably supported on its right end. The retaining arm 14 pivots in association with the opening/closing of the cassette cover 6. Specifically, the retaining arm 14 can pivot between a printing position (see FIG. 2) in which the left end of the retaining arm 14 has been moved rearward, and a retracted position in which the left end of the retaining arm 14 has been moved forward. The retaining arm 14 rotatably supports a platen roller 12 and a pinch roller 13. When the retaining arm 14 is disposed in the printing position, the platen roller 12 presses the tape 50 and ink ribbon 60 against the thermal head 10, whereby the tape 50 and ink ribbon 60 are brought into pressure contact with each other. The pinch roller 13 and the tape drive roller 46 pinch the tape 50 therebetween.

First and second cutting parts 17 and 18 for cutting the tape 50 that has been subjected to printing using the thermal head 10 are provided in the vicinity of the discharge opening 9. The first and second cutting parts 17 and 18 each have a cutting blade extending in parallel to an orthogonal direction that is a direction orthogonal to the conveying direction of the tape 50. The cutting blade is driven by a cut motor 24 (see FIG. 3). The first cutting part 17 is provided downstream of the thermal head 10 in the conveying direction of the tape 50. The first cutting part 17 performs a full-cut on the tape 50. A full cut is a cutting method of cutting through both the base material and release paper of the tape 50 in the thickness direction across the entire width thereof. The second cutting part 18 is provided downstream of the first cutting part 17 in the conveying direction of the tape 50. The second cutting part 18 performs a half-cut on the tape 50. A half cut is a cutting method of cutting only through the base material of the tape 50 in the thickness direction across the entire width thereof, while not cutting through the release paper.

<Electrical Configuration of the Printing Device 1>

Figure 3:
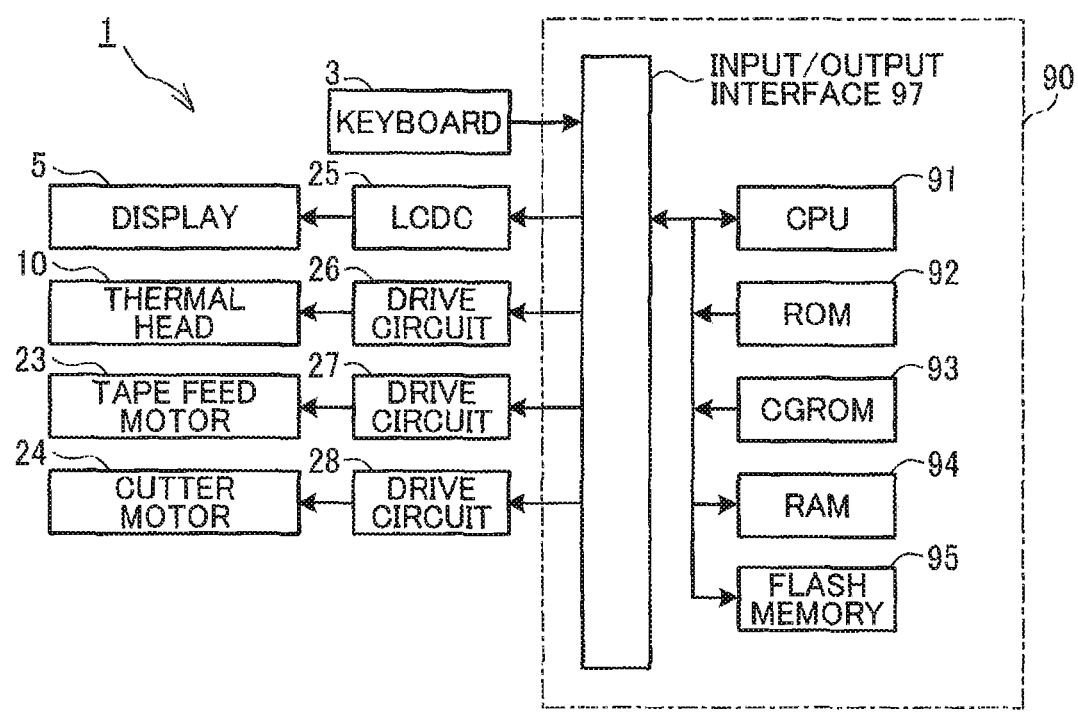
FIG. 3 is a block diagram illustrating the electrical configuration of the printing device 1 according to the first embodiment.

Next, the electrical configuration of the printing device 1 will be described with reference to FIG. 3. FIG. 3 is a block diagram illustrating the electrical configuration of the printing device 1. The printing device 1 is provided with a control circuit unit 90. The control circuit unit 90 is provided with a CPU 91, a ROM 92, a character generator ROM (CGROM) 93, a RAM 94, a flash memory 95, and an input-output interface 97, all of which components are connected via a data bus. The CPU 91 performs overall control of the printing device 1 by controlling drive of the ribbon take-up shaft 44A, the tape drive shaft 46A, the thermal head 10 (see FIG. 2) and the like. The ROM 92 stores various parameters required when the CPU 91 executes various programs. The CGROM 93 stores built-in fonts and the like. The RAM 94 includes a text memory and a print buffer and the like.

The flash memory 95 stores various programs (i.e., various sets of program instructions) and the like that can be executed by the CPU 91. The flash memory 95 further stores print data, a full-cut time Tf, and a half-cut time Th. The print data defines a dot pattern of a plurality of heat-generating elements of the thermal head 10 which are caused to generate heat for printing an object. The full-cut time Tf defines, in a case where a full-cut on the tape 50 is to be performed, a time period from a time when printing of an object is completed to a time when the first cutting part 17 performs a full-cut through the tape 50. Hereinafter, the timing of the full-cut specified in accordance with the full-cut time Tf is referred to a full-cut timing. The half-cut time Th defines, in a case where a half-cut on the tape 50 is to be performed, a time period from a time when printing of an object is completed and a time when the second cutting part 18 performs a half-cut on the tape 50. Hereinafter, the timing of the half-cut specified in accordance with the half-cut time Th is referred to a half-cut timing.

The input-output interface 97 is connected to the keyboard 3, a liquid crystal drive circuit (LCDC) 25, and drive circuits 26, 27, and 28. The LCDC 25 has video RAM (not shown) for outputting display data to the display 5. The drive circuit 26 is an electronic circuit for driving the thermal head 10. The drive circuit 27 is an electronic circuit for driving the tape feed motor 23. The drive circuit 28 is an electronic circuit for driving the cutting motor 24.

<Overview of a Printing Operation>

The operator inserts the tape cassette 30 into the cassette mounting section 8 and then closes the body cover 2 (i.e., closes the cassette cover 6). Through this operation, the retaining arm 14 moves from the retracted position to the printing position. At this time, the platen roller 12 and the thermal head 10 pinch the tape 50 and the ink ribbon 60 between the platen roller 12 and the thermal head 10; the ink ribbon 60 is interposed between the tape 50 and the thermal head 10; and the pinch roller 13 and the tape drive roller 46 pinch the tape 50 between the pinch roller 13 and the tape drive roller 46.

The CPU 91 drives the tape feed motor 23 via the drive circuit 27. Through this action, the ribbon take-up shaft 44A and the tape drive shaft 46A rotate in association with each other. The ribbon take-up shaft 44A rotates the ribbon take-up spool 44 in the direction of an arrow Y1 shown in FIG. 2. At this time, the ink ribbon 60 is paid out from the ribbon spool 42. Additionally, the tape drive shaft 46A rotates the tape drive roller 46 in the direction of an arrow Y2 shown in FIG. 2. At this time, the tape 50 is paid out from the tape spool 40 and conveyed along the conveying path P from the upstream side toward the downstream side.

The platen roller 12 rotates in response to the tape 50 being conveyed by the tape drive roller 46. The platen roller 12 presses the tape 50 paid out from the tape spool 40 against the thermal head 10. The CPU 91 specifics, based on the print data stored in the flash memory 95, the timing of supplying electric power to the plurality of heat-generating elements in the thermal head 10 (hereinafter, referred to as a print timing). The CPU 91 supplies electric power to the plurality of heat-generating elements on the basis of the specified print timing, causing the plurality of heat-generating elements to generate heat. Through this operation, ink is transferred from the ink ribbon 60 to the tape 50, so that an object is formed on the tape 50. In the following description, "the plurality of heat-generating elements in the thermal head 10 generates heat by being supplied with electric power" will be described as "the thermal head 10 is heated". Ink in the ink ribbon 60 is repeatedly transferred onto the tape 50 as the tape 50 is conveyed along the conveying path P from the upstream side toward the downstream side by the tape drive roller 46. Through this transfer of ink, an object is printed on the tape 50.

The pinch roller 13 rotates in response to the tape 50 being conveyed by the tape drive roller 46. The tape drive roller 46 and the pinch roller 13 convey the tape 50 on which the object has been printed toward the discharge opening 9 disposed at the downstream side in the conveying direction.

In a case where a full-cut is performed on the tape 50, the CPU 91 drives the cut motor 24 through the drive circuit 28 at the full-cut timing after printing of the object is completed. By this, the cut motor 24 is rotated in a predetermined direction to cause the first cutting part 17 to perform a full-cut through the tape 50 on which the object has been printed, thereby cutting off it from the tape cassette 30. On the other hand, in a case where a half-cut is performed on the tape 50, the CPU 91 drives the cut motor 24 through the drive circuit 28 at the half-cut timing after printing of the object is completed. By this, the cut motor 24 is rotated in a direction opposite to the predetermined direction to cause the second cutting part 18 to perform a half-cut on the tape 50 on which the object has been printed. The tape 50 that has been full-cut or half-cut is discharged from the discharge opening 9. The used ink ribbon 60 is taken up on the take-up spool 44.

<Scale Groups D1 and D2 Printed in the First Embodiment>

Figure 4A:
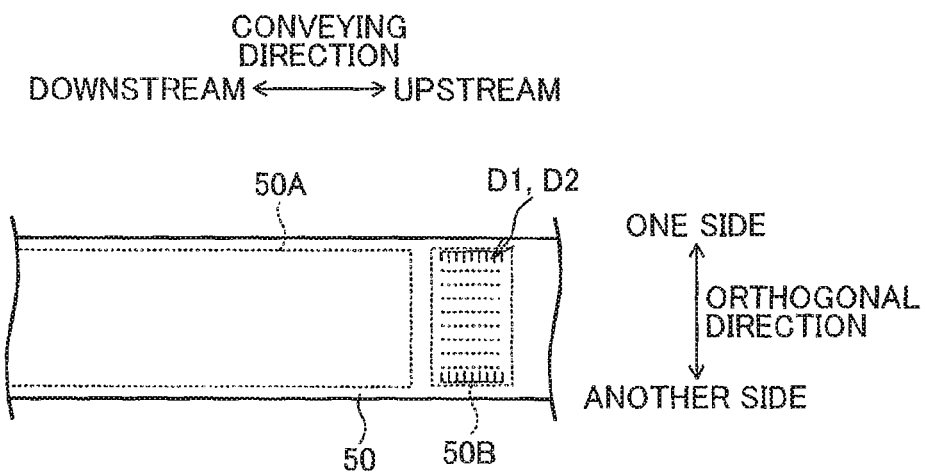
FIG. 4A is a view illustrating a position at which a scale group D1 or a scale group D2 is printed on a tape 50 by the printing device 1 according to the first embodiment.
Figure 4B:
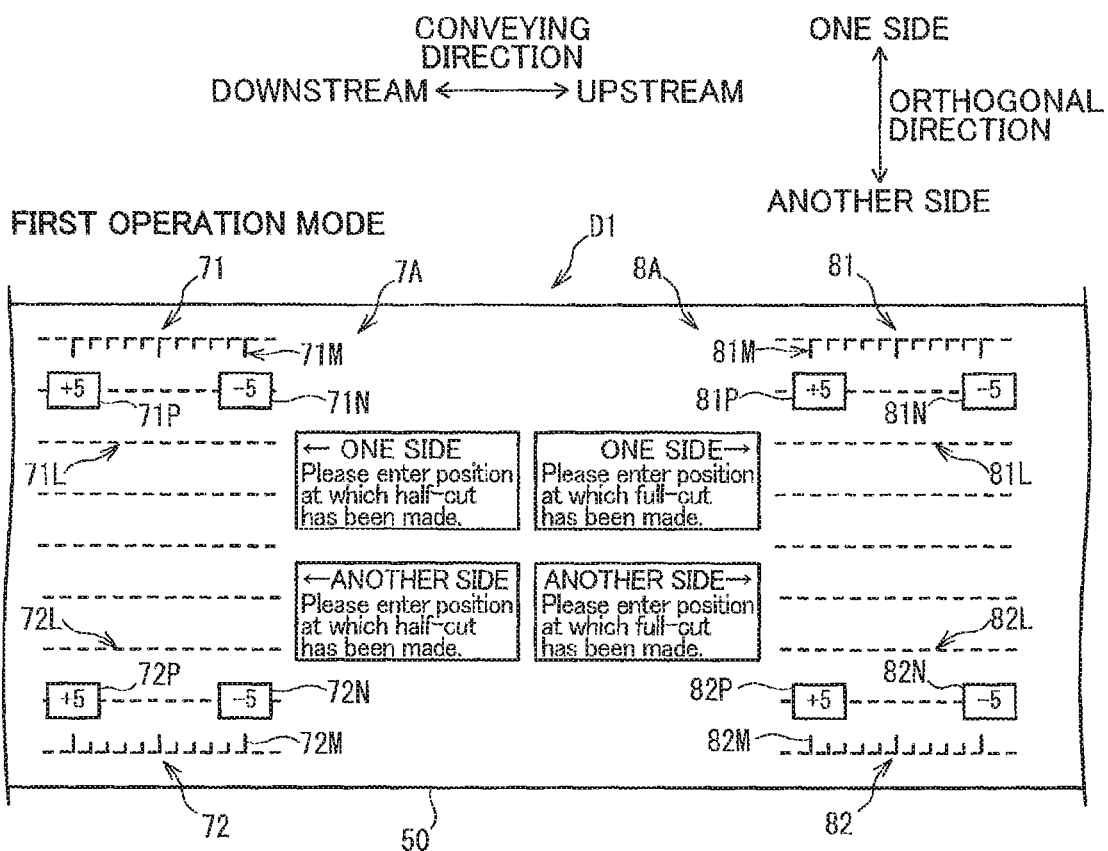
FIG. 4B is a view illustrating the scale group D1 printed on the tape 50 by the printing device 1 according to the first embodiment.

With reference to FIGS. 4A, 4B, 4C and FIG. 5, scale groups D1 and D2 printed in the first embodiment of the present disclosure will be described. The scale group D1 is printed on the tape 50 by the printing device 1 operating under a first operation mode in the first embodiment. The scale group D2 is printed on the tape 50 by the printing device 1 operating under a second operation mode in the first embodiment. FIG. 4A illustrates a position at which a scale group D1 or a scale group D2 is printed. FIG. 4B illustrates the scale group D1 that the printing device 1 operating in the first operation mode in the first embodiment prints on the tape 50. FIG. 4C illustrates the scale group D2 that the printing device 1 operating in the second operation mode in the first embodiment prints on the tape 50.

As illustrated in FIG. 4A, the CPU 91 prints the scale group D1 or D2 in a margin area 50B of the tape 50 different from a print area 50A on which an object designated by a user is printed. The margin area 50B is positioned upstream of the print area 50A. The scale groups D1 and D2 are each used for correcting a displacement, if any, between an actual cut position and a designed cut position. The actual cut position is a cut position at which the tape 50 is actually cut by the first cutting part 17 or second cutting part 18. The designed cut position is a cut position in design.

With reference to FIG. 4B, the scale group D1 will be described. The scale group D1 includes a first half-cut scale 71, a second half-cut scale 72, a first full-cut scale 81, and a second full-cut scale 82. Hereinafter, the first half-cut scale 71 and second half-cut scale 72 are sometimes collectively referred to as a half-cut scale 7A, and the first full-cut scale 81 and second full-cut scale 82 are sometimes collectively referred to as a full-cut scale 8A.

The first half-cut scale 71 has a plurality of first line segments 71M arranged in the conveying direction at equal intervals and extending in the orthogonal direction. The first line segments 71M are disposed in the vicinity of one end edge of the tape 50 in the orthogonal direction. The second half-cut scale 72 has a plurality of first line segments 72M arranged in the conveying direction at equal intervals and extending in the orthogonal direction. The first line segments 72M are disposed in the vicinity of the other end edge of the tape 50 in the orthogonal direction. That is, the plurality of first line segments 71M and the plurality of first line segments 72M are arranged at mutually different positions in the orthogonal direction. Further, each of the plurality of first line segments 71M and a corresponding one of the plurality of first line segments 72M are arranged at the same position in the conveying direction.

The number of the plurality of first line segments 71M and that of the plurality of first line segments 72M are each eleven (11). In both the first line segments 71M and first line segments 72M, the most downstream line segment, the most upstream line segment, and the center line segment in the conveying direction are longer in the orthogonal direction than the other line segments.

Here, each of the first line segments 71M has one end and the other end in the orthogonal direction; the other end is closer to the other end edge of the tape 50 in the orthogonal direction than the one end is to the other end edge of the tape 50 in the orthogonal direction. Further, each of the first line segments 72M has one end and the other end in the orthogonal direction; the one end is closer to the one end edge of the tape 50 in the orthogonal direction than the other end is to the one end edge of the tape 50 in the orthogonal direction.

A combination of a sign and a numeral "+5" (hereinafter, referred to as a first positive numeric value 71P) is disposed in the vicinity of the other end in the orthogonal direction of the most downstream line segment of the first line segments 71M. Similarly, a combination of a sign and a numeral "−5" (hereinafter, referred to as a first negative numeric value 71N) is disposed in the vicinity of the other end in the orthogonal direction of the most upstream line segment of the first line segments 71M. According to the first positive numeric value 71P and first negative numeric value 71N, numerals "+5", "+4", "+3", "+2", "+1", "0", "−1", "−2", "−3", "−4", and "−5" are associated respectively with the eleven first line segments 71M in this order from the downstream side to the upstream side in the conveying direction.

A combination of a sign and a numeral "+5" (hereinafter, referred to as a second positive numeric value 72P) is disposed in the vicinity of the one end in the orthogonal direction of the most downstream line segment of the first line segments 72M. Similarly, a combination of a sign and a numeral "−5" (hereinafter, referred to as a second negative numeric value 72N) is disposed in the vicinity of the one end in the orthogonal direction of the most upstream line segment of the first line segments 72M. According to the second positive numeric value 72P and second negative numeric value 72N, numerals "+5", "+4", "+3", "+2", "+1", "0", "−1", "−2", "−3", "−4", and "−5" are associated respectively with the eleven first line segments 72M in this order from the downstream side to the upstream side in the conveying direction.

The numeral corresponding to the center line segment in the conveying direction in the first line segments 71M and 72M is "0". The position of the center line segment in the conveying direction is adjusted so as to coincide with a half-cut position in design at which the second cutting part 18 performs a half-cut on the tape 50 at the half-cut timing specified based on the half-cut time Th stored in the flash memory 95.

The first half-cut scale 71 further has a plurality of second line segments 71L arranged in the orthogonal direction at equal intervals and extending in the conveying direction. The plurality of second line segments 71L includes: a dashed line at the center in the orthogonal direction of the tape 50; a dashed line connecting the one ends in the orthogonal direction of the first line segments 71M; and three dashed lines dividing a space between the above two dashed lines into four equal areas in the orthogonal direction.

The second half-cut scale 72 further has a plurality of second line segments 72L arranged in the orthogonal direction at equal intervals and extending in the conveying direction. The plurality of second line segments 72L includes: a dashed line at the center in the orthogonal direction of the tape 50; a dashed line connecting the other ends in the orthogonal direction of the first line segments 72M; and three dashed lines dividing a space between the above two dashed lines into four equal areas in the orthogonal direction.

Note that the line segment arranged at the center in the orthogonal direction of the tape 50 included in the plurality of second line segments 71L and the line segment arranged at the center in the orthogonal direction of the tape 50 included in the plurality of second line segments 72L overlap each other.

A character string to prompt input of a first half-cut parameter (described later) is disposed upstream of the plurality of second line segments 71L of the first half-cut scale 71 in the conveying direction. A character string to prompt input of a second half-cut parameter (described later) is disposed upstream of the plurality of second line segments 72L of the second half-cut scale 72 in the conveying direction.

The first full-cut scale 81 is disposed upstream of the first half-cut scale 71 in the conveying direction. The first full-cut scale 81 has the same configuration as that of the first half-cut scale 71. A plurality of first line segments 81M, a first positive numeric value 81I, a first negative numeric value 81N, and a plurality of second line segments 81L of the first full-cut scale 81 correspond respectively to the plurality of first line segments 71M, the first positive numeric value 71P, the first negative numeric value 71N, and the plurality of second line segments 71L of the first half-cut scale 71.

The second full-cut scale 82 is disposed upstream of the second half-cut scale 72 in the conveying direction. The second full-cut scale 82 has the same configuration as that of the second half-cut scale 72. A plurality of first line segments 82M, a second positive numeric value 82P, a second negative numeric value 82N, and a plurality of second line segments 82L of the second full-cut scale 82 correspond respectively to the plurality of first line segments 72M, the second positive numeric value 72P, the second negative numeric value 72N, and the plurality of second line segments 72L of the second half-cut scale 72.

The positional relationship between the plurality of first line segments 81M, the plurality of second line segments 81L of the first full-cut scale 81 and the plurality of first line segments 82M, the plurality of second line segments 82L of the second full-cut scale 82 corresponds to the positional relationship between the plurality of first line segments 71M, the plurality of second line segments 71L of the first half-cut scale 71 and the plurality of first line segments 72M, the plurality of second line segments 72L of the second half-cut scale 72.

The numeral corresponding to the center line segment in the conveying direction in the first line segments 81M and 82M is "0". The position of the center line segment in the conveying direction is adjusted so as to coincide with a full-cut position in design at which the first cutting part 17 performs a full-cut through the tape 50 at the full-cut timing specified based on the full-cut time Tf stored in the flash memory 95.

FIG. 4C illustrates the scale group D2 that the printing device 1 operating in the second operation mode in the first embodiment prints on the tape 50. The scale group D2 differs from the scale group D1 (see FIG. 4A) in that the scale group D2 does not have the full-cut scale 8A (the first full-cut scale 81 and the second full-cut scale 82). That is, the scale group D2 has the half-cut scale 7A (the first half-cut scale 71 and the second half-cut scale 72) but does not have the full-cut scale 8A (the first full-cut scale 81 and the second full-cut scale 82).

<First Main Process>

Figure 5:
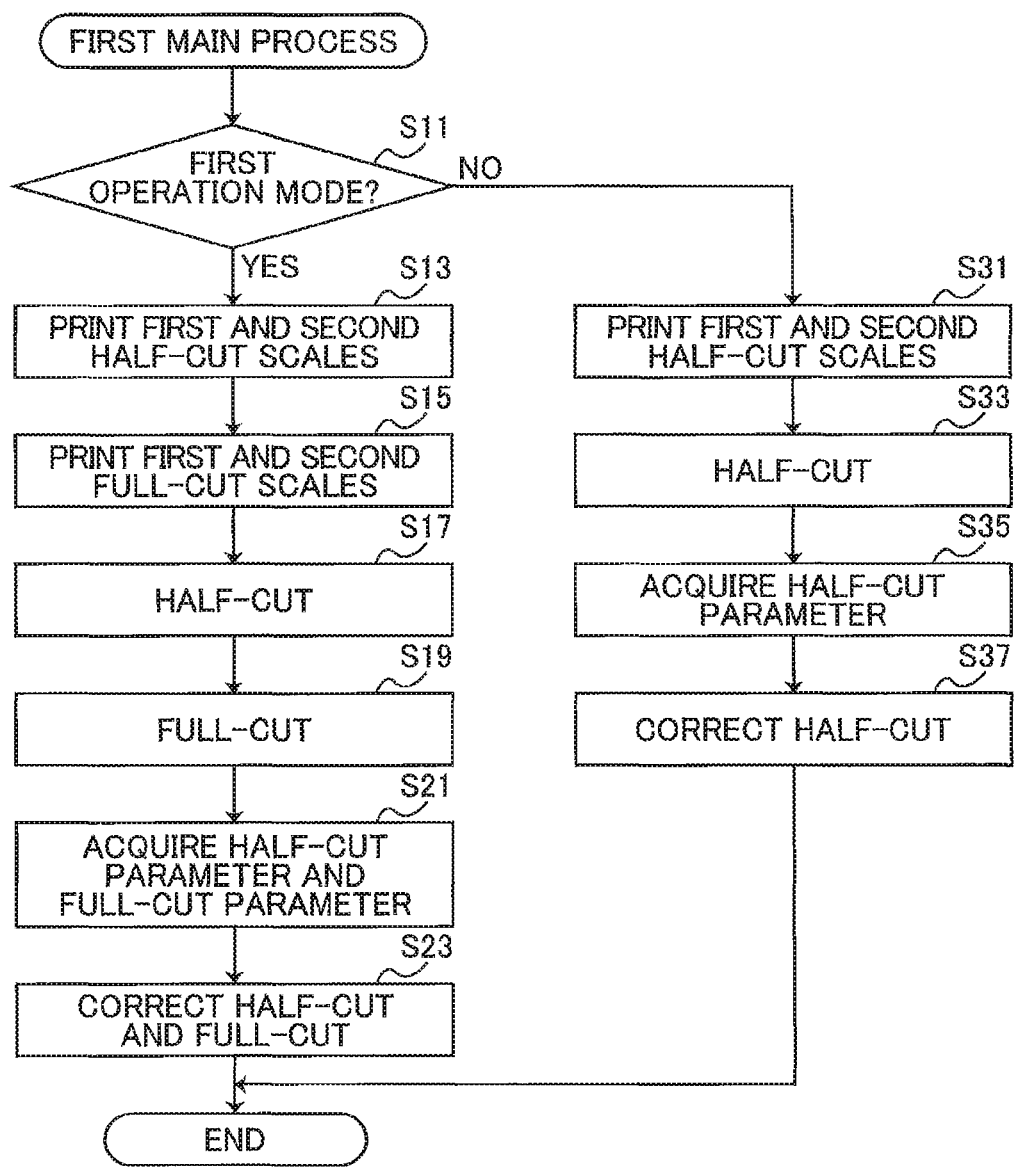
FIG. 5 is a flowchart illustrating a first main process executed by the printing device 1 according to the first embodiment.

With reference to FIG. 5, a first main process executed by the CPU 91 in the first embodiment will be described. When an instruction to start printing is inputted through the keyboard 3, the CPU 91 starts the first main process by reading out and executing a program (i.e., a set of program instructions) stored in the flash memory 95.

The CPU 91 first determines whether an instruction to operate in the first operation mode or an instruction to operate in the second operation mode has been set through the keyboard 3 (S11). When determining that an instruction to operate under the first operation mode has been set (YES in S11), the CPU 91 proceeds to the process of S13. In order to operate under the first operation mode according to the setting, the CPU 91 executes the process of S13 to S23. The first operation mode is an operation mode in which the printing device 1 prints the half-cut scale 7A and full-cut scale 8A (see FIG. 4B) on the tape 50.

On the other hand, when determining that an instruction to operate under the second mode has been set (NO in S11), the CPU 91 proceeds to the process of S33. In order to operate in the second operation mode according to the setting, the CPU 91 executes the process of S31 to S37. The second operation mode is an operation mode in which the printing device 1 prints only the half-cut scale 7A (see FIG. 4C) on the tape 50. After completion of the operation in the first or second operation mode, the CPU 91 ends the first main process.

In a case where the printing device 1 (the CPU 91) operates under the first operation mode, the CPU 91 first drives the tape feed motor 23 to rotate the same, thereby starting to convey the tape 50. Then, the CPU 91 heats the thermal head 10 at the print timing specified based on the print data stored in the flash memory 95 to print an object in the print area 50A (see FIG. 4A) of the tape 50. After completion of the printing of the object in the print area 50A, the CPU 91 first prints the half-cut scale 7A (see FIGS. 4A and 4B) in the margin area 50B (S13). Subsequently, the CPU 91 prints the full-cut scale 8A (see FIGS. 4A and 4B) in the margin area 50B at a position upstream of the printed half-cut scale 7A (S15).

When the half-cut timing has come after completion of the printing of the object, the CPU 91 temporarily stops conveying the tape 50 and performs a half-cut on the tape 50 using the second cutting part 18 (S17). As a result, both the first half-cut scale 71 and the second half-cut scale 72 printed on the tape 50 in the process of S13 are half-cut. Then, the CPU 91 resumes conveying the tape 50. Subsequently, when the full-cut timing has arrived, the CPU 91 temporarily stops conveying the tape 50 and performs a full-cut through the tape 50 using the first cutting part 17 (S19). As a result, both the first full-cut scale 81 and the second full-cut scale 82 printed on the tape 50 in the process of S15 are full-cut.

Figure 6:
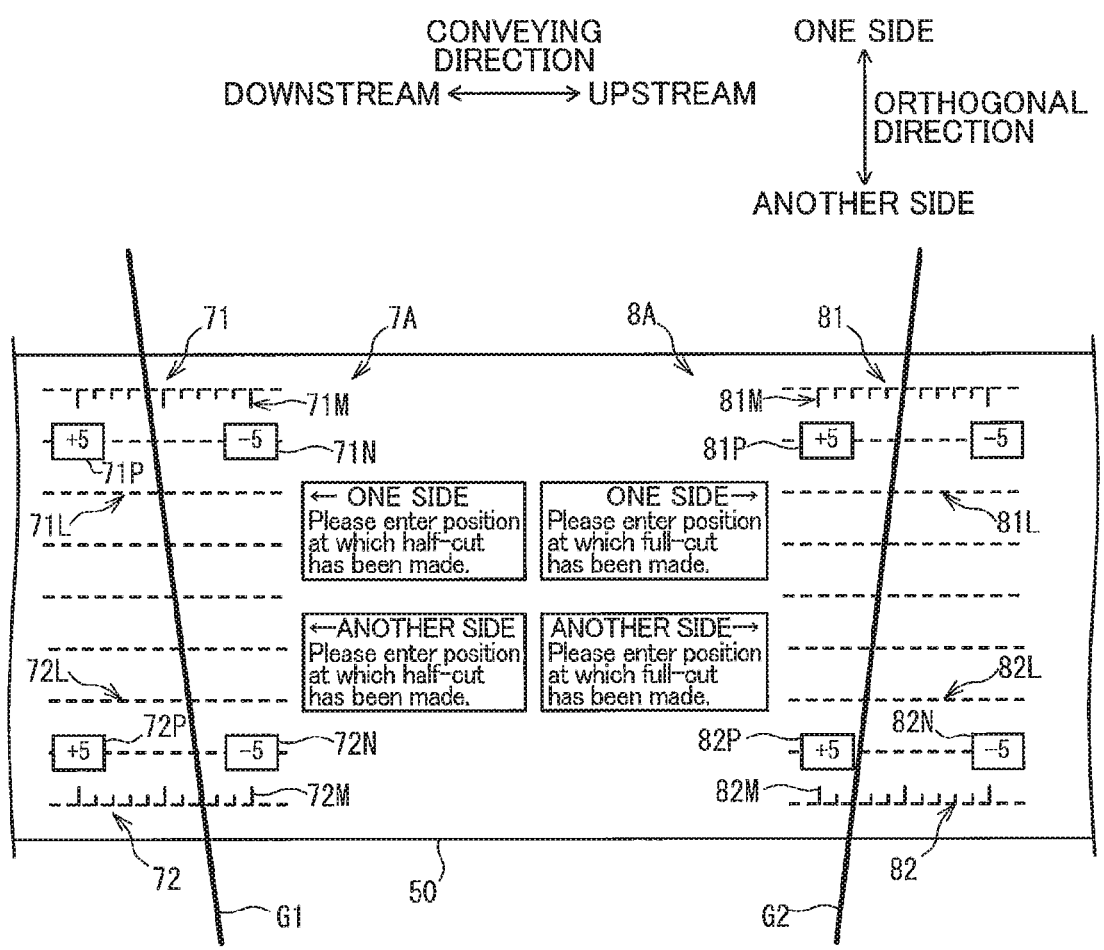
FIG. 6 is a view illustrating a specific example of a case where the tape 50 having the scale group D1 printed thereon has been subjected to a half-cut and full-cut in the printing device 1 according to the first embodiment the first embodiment.

FIG. 6 schematically illustrates the tape 50 that has been subjected to the half-cut and full-cut by the above process. A straight line G1 denotes an example of a second cut position. The second cut position is a position which has been half-cut by the second cutting part 18. A straight line G2 denotes an example of a first cut position. The first cut position is a position which has been full-cut by the first cutting part 17.

A user identifies the numeral "+1" corresponding to the line segment overlapped with the second cut position among the plurality of first line segments 71M of the first half-cut scale 71 of the tape 50. Further, the user identifies the numeral "−2" corresponding to the line segment overlapped with the second cut position among the plurality of first line segments 72M of the second half-cut scale 72 of the tape 50.

Hereinafter, the numeral corresponding to the line segment overlapped with the second cut position among the plurality of first line segments 71M of the first half-cut scale 71 (i.e., the numeral corresponding to the first line segment 71M which is overlapped with the second cut position) is referred to as a first half-cut parameter. Further, the numeral corresponding to the line segment overlapped with the second cut position among the plurality of first line segments 72M of the second half-cut scale 72 (i.e., the numeral corresponding to the first line segment 72M which is overlapped with the second cut position) is referred to as a second half-cut parameter. The first half-cut parameter and second half-cut parameter are sometimes collectively referred to as a half-cut parameter.

Further, the user identifies the numeral "0" corresponding to the line segment overlapped with the first cut position among the plurality of first line segments 81M of the first full-cut scale 81 of the tape 50. Further, the user identifies the numeral "+3" corresponding to the line segment overlapped with the first cut position among the plurality of first line segments 82M of the second full-cut scale 82 of the tape 50.

Hereinafter, the numeral corresponding to the line segment overlapped with the first cut position among the plurality of first line segments 81M of the first full-cut scale 81 (i.e., the numeral corresponding to the first line segment 81M which is overlapped with the first cut position) is referred to as a first full-cut parameter. Further, the numeral corresponding to the line segment overlapped with the first cut position among the plurality of first line segments 82M of the second full-cut scale 82 (i.e., the numeral corresponding to the first line segment 82M which is overlapped with the first cut position) is referred to as a second full-cut parameter. The first full-cut parameter and second full-cut parameter are sometimes collectively referred to as a full-cut parameter.

The user inputs the identified half-cut parameter (i.e., the identified first and second half-cut parameters) and full-cut parameter (i.e., the identified first and second full-cut parameters) to the printing device 1 through the keyboard 3. As illustrated in FIG. 5, the CPU 91 of the printing device 1 acquires the inputted half-cut parameter and full-cut parameter (S21).

The CPU 91 identifies, on the basis of the acquired first half-cut parameter, the position of the corresponding first line segment 71M of the first half-cut scale 71 as a cut position by the second cutting part 18. Similarly, the CPU 91 identifies, on the basis of the acquired second half-cut parameter, the position of the corresponding first line segment 72M of the second half-cut scale 72 as a cut position by the second cutting part 18. The CPU 91 determines the average position of the identified two cut positions as the conveying direction position (the position in the conveying direction) at which the second cutting part 18 performs a half-cut.

For example, in the example illustrated in FIG. 6, the CPU 91 acquires "+1" as the first half-cut parameter and "−2" as the second half-cut parameter. Thus, the CPU 91 determines, as the average position of the second cut position, the conveying direction position corresponding to "−0.5" (=(+1−2)/2) which is the average value of "+1" and "−2". Note that the fact that the conveying direction position corresponding to "−0.5" is determined as the average position of the second cut position means that the actual cut position by the cutting part 18 is deviated upstream in the conveying direction from the half-cut position in design (i.e., the conveying direction position corresponding to the average value "0") by a distance corresponding to the absolute value of the average value "−0.5".

The CPU 91 corrects, on the basis of the determined average position of the second cut position, the half-cut time Th stored in the flash memory 95 so that the second cutting part 18 performs a half-cut on the tape 50 at the half-cut position in design, i.e., at the conveying direction position corresponding to the average value "0" (S23). As a result, the half-cut timing which is a timing when the printing device 1 next half-cuts the tape 50 using the second cutting part 18 is adjusted.

For example, in the example illustrated in FIG. 6, the conveying direction position corresponding to the average value "−0.5" is determined as the average position of the second cut position. Thus, the CPU 91 reduces the half-cut time Th stored in the flash memory 95 so that the second cutting part 18 performs a half-cut on the tape 50 at the half-cut position in design (i.e., at the same position in the conveying direction as that of the first line segment 72M corresponding to "0"). Accordingly, the half-cut timing which is a timing when the printing device 1 next half-cuts the tape 50 using the second cutting part 18 becomes earlier than that before correction, whereby the tape 50 is half-cut at the half-cut position in design (i.e., at the conveying direction position corresponding to the average value "0").

Similarly, the CPU 91 identifies, on the basis of the acquired first full-cut parameter, the position of the corresponding first line segment 81M of the first full-cut scale 81 as a cut position by the first cutting part 17. Further, the CPU 91 identifies, on the basis of the acquired second full-cut parameter, the position of the corresponding first line segment 82M of the second full-cut scale 82 as a cut position by the first cutting part 17. The CPU 91 determines the average position of the identified two cut positions as the conveying direction position (the position in the conveying direction) at which the first cutting part 17 performs a full-cut.

For example, in the example illustrated in FIG. 6, the CPU 91 acquires "0" as the first full-cut parameter and "+3" as the second full-cut parameter. Thus, the CPU 91 determines, as the average position of the first cut position, the conveying direction position corresponding to "+1.5" (=(0+3)/2) which is the average value of "0" and "+3". Note that the fact that the conveying direction position corresponding to the average value "+1.5" is determined as the average position of the first cut position means that the actual cut position by the cutting part 17 is deviated downstream in the conveying direction from the full-cut position in design (i.e., the conveying direction position corresponding to the average value "0") by a distance corresponding to the absolute value of the average value "+1.5".

The CPU 91 corrects, on the basis of the determined average position of the first cut position, the full-cut time Tf stored in the flash memory 95 so that the first cutting part 17 full-cuts the tape 50 at the full-cut position in design, i.e., at the conveying direction position corresponding to the average value "0" (S23). As a result, the full-cut timing which is a timing when the printing device 1 next full-cuts the tape 50 using the first cutting part 17 is adjusted.

For example, in the example illustrated in FIG. 6, the conveying direction position corresponding to the average value "+1.5" is determined as the average position of the first cut position. Thus, the CPU 91 increases the full-cut time Tf stored in the flash memory 95 so that the first cutting part 17 performs a full-cut through the tape 50 at the full-cut position in design (i.e., at the same position in the conveying direction as that of the first line segment 82M corresponding to "0"). Thus, the full-cut timing which is a timing when the printing device 1 next full-cuts the tape 50 using the first cutting part 17 becomes later than that before correction, whereby the tape 50 is full-cut at the full-cut position in design (i.e., at the conveying direction position corresponding to the average value "1.5"). The CPU 91 ends the first main process.

On the other hand, in a case where the printing device 1 (the CPU 91) operates under the second operation mode (NO in S11), the CPU 91 drives the tape feed motor 23 to rotate the same, thereby starting to convey the tape 50. Then, the CPU 91 heats the thermal head 10 at the print timing specified based on the print data stored in the flash memory 95 to print an object in the print area 50A of the tape 50. After printing the object in the print area 50A, the CPU 91 prints the half-cut scale 7A (see FIGS. 4A and 4C) in the margin area 50B (S31). Unlike the first operation mode, the CPU 91 does not print the full-cut scale 8A (see FIG. 4B). When the half-cut timing has arrived after printing the object, the CPU 91 half-cuts the tape 50 using the second cutting part 18 (S33). As a result, both the first half-cut scale 71 and second half-cut scale 72 printed on the tape 50 in the process of S31 are half-cut. Then, the CPU 91 stops the tape feed motor 23, thereby stopping conveying the tape 50.

The user identifies, as the first half-cut parameter, the numeral corresponding to the line segment overlapped with the second cut position among the plurality of first line segments 71M of the first half-cut scale 71 of the tape 50. Further, the user identifies, as the second half-cut parameter, the numeral corresponding to the line segment overlapped with the second cut position among the plurality of first line segments 72M of the second half-cut scale 72 of the tape 50. The user inputs the identified first and second half-cut parameters to the printing device 1 through the keyboard 3. The CPU 91 acquires the inputted half-cut parameters (S35).

The CPU 91 determines the average position of the second cut position on the basis of the acquired half-cut parameters. The CPU 91 corrects the half-cut time Th stored in the flash memory 95 so that the second cutting part 18 half-cuts the tape 50 at the half-cut position in design (S37). After that, the CPU 91 ends the first main process.

<Functions and Effects of First Embodiment>

The printing device 1 prints the half-cut scale 7A and full-cut scale 8A on the tape 50 (S13, S15, S31). The printing device 1 adjusts the half-cut timing on the basis of the first half-cut parameter corresponding to the second cut position on the first half-cut scale 71 and the second half-cut parameter corresponding to the second cut position on the second half-cut scale 72 (S23, S37). Further, the printing device 1 adjusts the full-cut timing on the basis of the first full-cut parameter corresponding to the first cut position on the first full-cut scale 81 and the second full-cut parameter corresponding to the first cut position on the second full-cut scale 82 (S23). In this case, the adjustment is made such that the positional relationship in the conveying direction between the printed object and the first and second cut positions approximates a designed one.

The first half-cut scale 71 and the second half-cut scale 72 are printed at mutually different positions in the orthogonal direction, and the first full-cut scale 81 and the second full-cut scale 82 are also positioned at mutually different positions in the orthogonal direction. With this configuration, even when the first cut position cut at which the first cutting part 17 cuts and the second cut position at which the second cutting part 18 cuts are each inclined with respect to the orthogonal direction, the printing device 1 can identify appropriate cut positions considering the inclination and make adjustment so as to allow the first cutting part 17 and second cutting part 18 to cut the tape 50 at the appropriate cut positions.

The printing device 1 calculates the average value of the first and second half-cut parameters and adjusts the half-cut timing on the basis of the average position of the second cut position that is a conveying direction position (i.e., a position in the conveying direction) corresponding to the calculated average value (S23, S37). Further, the printing device 1 calculates the average value of the first and second full-cut parameters and adjusts the full-cut timing on the basis of the average position of the first cut position that is a conveying direction position (a position in the conveying direction) corresponding to the calculated average value (S23). With this configuration, the printing device 1 can easily identify an appropriate cut position considering the inclinations of the first and second cut positions with respect to the orthogonal direction.

The half-cut scale 7A has the plurality of first line segments 71M arranged in the conveying direction at equal intervals and the plurality of first line segments 72M arranged in the conveying direction at equal intervals. The full-cut scale 8A has the plurality of first line segments 81M arranged in the conveying direction at equal intervals and the plurality of first line segments 82M arranged in the conveying direction at equal intervals. This allows the user to easily identify the cut positions corresponding to the plurality of first line segments 71M, 72M, 81M, and 82M as parameters and to input the identified parameters to the printing device 1. Further, the printing device 1 can specify appropriate cut positions by acquiring the accurate parameters from the user and can thus accurately adjust the half-cut timing and full-cut timing.

The first positive numeric value 71P and the first negative numeric value 71N are disposed in the vicinity of the plurality of first line segments 71M. The first positive numeric value 81P and the first negative numeric value 81N are disposed in the vicinity of the plurality of first line segments 81M. The second positive numeric value 72P and the second negative numeric value 72N are disposed in the vicinity of the plurality of first line segments 72M. The second positive numeric value 82P and the second negative numeric value 82N are disposed in the vicinity of the plurality of first line segments 82M. This allows the user to easily specify the numerals corresponding to the line segments that overlapped with the cut positions (the first and second cut positions) among the plurality of first line segments 71M, 81M, 72M, and 82M on the basis of the first positive numeric values 71P, 81P, first negative numeric values 71N, 81N, second positive numeric values 72P, 82P, and second negative numeric values 72N, 82N. Thus, the printing device 1 allows the user to easily identify the half-cut parameter and full-cut parameter.

Assuming that the full-cut scale 8A is first printed and the half-cut scale 7A is then printed, a portion of the tape 50 on which the full-cut scale 8A has been printed is cut off from the remaining portion of the tape 50 by execution of the full-cut, and then the remaining portion of the tape 50 on which the half-cut scale 7A has been printed is half-cut. In this case, the tape 50 may be jammed in the discharge port 9 when the tape 50 is conveyed during a time period from a time when the full-cut is completed to a time when the half-cut is started. In view of the above, in the first embodiment, the printing device 1 first prints the half-cut scale 7A and then prints the full-cut scale 8A. In this case, the full-cut is executed after execution of the half-cut, so that the tape 50 is not separated until the full-cut is executed. This can reduce a possibility that the tape 50 is jammed in the discharge port 9.

The printing device 1 operates in the first operation mode under which the printing device 1 prints both the half-cut scale 7A and full-cut scale 8A or under the second operation mode in which the printing device 1 prints the half-cut scale 7A but does not print the full-cut scale 8A. That is, an operation mode of printing only the full-cut scale 8A does not exist. With this configuration, generation of short cut-off pieces of the tape 50 due to only the full-cut being performed can be prevented.

The printing device 1 prints an object in the print area 50A and prints the half-cut scale 7A and full-cut scale 8A in the margin area 50B different from the print area 50A. Accordingly, the printing device 1 can effectively utilize the margin area 50B of the tape 50 by printing thereon the half-cut scale 7A and full-cut scale 8A, while printing the object in the print area 50A. Further, the printed half-cut scale 7A and full-cut scale 8A can be used for adjustment of the half-cut timing and full-cut timing, respectively.

<Remarks of First Embodiment>

The printing device 1 adjusts the half-cut timing by correcting the half-cut time Th stored in the flash memory 95 to thereby adjust the positional relationship between a printed object and the second cut position at which a half-cut is performed. Alternatively, the printing device 1 may correct the print timing based on the first half-cut parameter and second half-cut parameter to adjust the positional relationship between a printed object and the second cut position at which a half-cut is performed. Further alternatively, the printing device 1 may adjust both the print timing and half-cut timing to adjust the positional relationship between a printed object and the second cut position at which a half-cut is performed.

The printing device 1 adjusts the full-cut timing by correcting the full-cut time Tf stored in the flash memory 95 to thereby adjust the positional relationship between a printed object and the first cut position at which a full-cut is performed. Alternatively, the printing device 1 may correct the print timing based on the first full-cut parameter and second full-cut parameter to adjust the positional relationship between a printed object and the first cut position at which a full-cut is performed. Further alternatively, the printing device 1 may adjust both the print timing and full-cut timing to adjust the positional relationship between a printed object and the first cut position at which a full-cut is performed.

The numeral (positive numeric value or negative numeric value) may be associated with each of the plurality of first line segments 71M. The same applies to the plurality of first line segments 81M, 72M, and 82M. Further, positive numeric values may be arranged in the vicinity of the plurality of first line segments 71M, respectively, in the ascending order from the upstream side to downstream side in the conveying direction. The same is true for the plurality of first line segments 81M, 72M, and 82M. Further, the first positive numeric values 71P and 81P, the first negative numeric values 71N and 81N, the second positive numeric values 72P and 82P, and the second negative numeric values 72N and 82N may not necessarily be printed on the tape 50.

The printing device 1 may first print the full-cut scale 8A and then print the half-cut scale 7A. Further, for example, the printing device 1 may have a configuration that has the first cutting part 17 but does not have the second cutting part 18. In this case, the printing device 1 may be configured to print the full-cut scale 8A on the tape 50 and not to print the half-cut scale 7A.

The printing device 1 may perform skew correction for an object to be printed in accordance with the inclination angle of the second cut position with respect to the orthogonal direction which is specified by the first half-cut parameter and second half-cut parameter. Alternatively, the printing device 1 may perform skew correction for an object to be printed in accordance with the inclination angle of the first cut position with respect to the orthogonal direction which is specified by the first full-cut parameter and second full-cut parameter.

When the first main process is performed, the printing device 1 may print only the scale groups D1 and D2 without printing an object. In this case, the half-cut time Th stored in the flash memory 95 may define a time elapsed since completion of the printing of the half-cut scale 7A. Similarly, the full-cut time Tf stored in the flash memory 95 may define a time elapsed since completion of the printing of the full-cut scale 8A.

Second Embodiment

Nest, a second embodiment of the present disclosure will be described with reference to FIGS. 7 and 8, wherein structures and components similar to those in the printing device 1 according to the first embodiment are designated with the same reference numerals to avoid duplicating description. The following description will focus on structures, components, and control that differ from those of the printing device 1 according to the first embodiment.

A printing device 1 according to the second embodiment differs from the printing device 1 according to the first embodiment: in that the printing device 1 according to the second embodiment prints scale groups D3 and D4 in place of the scale groups D1 and D2, and in that the printing device 1 according to the second embodiment performs a second main process instead of the first main process. FIG. 7 illustrates the scale groups D3 and D4 that the printing device 1 operating in the first operation mode in the second embodiment prints on the tape 50.

The CPU 91 first adjusts the half-cut timing and full-cut timing using the tape 50 on which the scale group D3 has been printed. After that, the CPU 91 prints the scale group D4 on the tape 50 and then performs the same process to finely adjust the half-cut timing and full-cut timing. Hereinafter, description will be given assuming that the printing device 1 operates under the first operation mode. Note that, when the printing device 1 operates under the second operation mode, the printing device 1 uses scale groups obtained by removing, from the scale groups D3 and D4, full-cut scales 8B and 8C (described later) corresponding to the full-cut.

As illustrated in FIG. 7A, the scale group D3 includes a half-cut scale 7B and a full-cut scale 8B. The half-cut scale 7B has a first half-cut scale 73 and a second half-cut scale 74. The full-cut scale 8B has a first full-cut scale 83 and a second full-cut scale 84.

The first half-cut scale 73 has a plurality of first line segments 73M, a plurality of characters 73P, a plurality of characters 73N, and a plurality of second line segments 73L.

The plurality of second line segments 73L are arranged in the orthogonal direction at equal intervals and extending in the conveying direction. The plurality of second line segments 73L includes a dashed line at the center in the orthogonal direction of the tape 50, a dashed line at the one end edge of the tape 50 in the orthogonal direction, and three dashed lines dividing a space between the above two dashed lines into four equal areas in the orthogonal direction. Hereinafter, these four equal areas into which the space between the above two dashed lines is divided by the three dashed lines will be simply referred to as four divided areas. Further, hereinafter, the four divided areas are referred to as areas R10, R11, R12, and R13 from the center to the one side in the orthogonal direction.

The plurality of characters 73P includes combinations of a sign and a numeral: "0"; "+1"; "+2"; and "+3". The plurality of characters 73P are located at downstream end portions of the plurality of second line segments 73L in the conveying direction. Further, each of the plurality of characters 73P is disposed within a corresponding one of the four divided areas. The plurality of characters 73P are arranged in the order of "0", "+1", "+2", and "+3" from the center to the one side in the orthogonal direction. That is, "0", "+1", "+2", and "+3" are disposed within the areas R10, R11, R12, and R13, respectively.

The plurality of characters 73N includes combinations of a sign and a numeral: "0"; "−1"; "−2"; and "−3". The plurality of characters 73N are located at upstream end portions of the plurality of second line segments 73L in the conveying direction. Further, each of the plurality of characters 73N is disposed within a corresponding one of the four divided areas. The plurality of characters 73N are arranged in the order of "0", "−1", "−2", and "−3" from the center to the one side in the orthogonal direction. That is, "0", "−1", "−2", and "−3" are disposed within the areas R10, R11, R12, and R13, respectively.

The plurality of first line segments 73M includes seven wide line segments extending in the orthogonal direction. The plurality of first line segments 73M are arranged in the conveying direction at equal intervals. More specifically, the centers of the plurality of first line segments 73M in the conveying direction are arranged in the conveying direction at equal intervals, that is, the center-to-center distances in the conveying direction between neighboring two first line segments 73M are the same as each other. The plurality of first line segments 73M are disposed within a corresponding one of the four divided areas. Therefore, the plurality of first line segments 73M are arranged at equal intervals also in the orthogonal direction. More particularly, the plurality of first line segments 73M are disposed within the areas R13, R12, R11, R10, R11, R12, and R13 in this order from the downstream side to upstream side in the conveying direction.

The conveying direction position of the downstream end edge of one first line segment 73M in the conveying direction coincides with that of the upstream end edge of another first line segment 73M neighboring the one first line segment 73M. The numerals "+3", "+2", "+1", "0", "−1", "−2", and "−3" are associated with the plurality of first line segments 73M in this order from the downstream side to upstream side in the conveying direction.

The plurality of characters 73P corresponding to "+3", "+2", "+1", and "0" and their corresponding first line segments 73M are adjacent to one another in the conveying direction and, similarly, the plurality of characters 73N corresponding to "0", "−1", "−2", and "−3" and their corresponding first line segments 73M are adjacent to one another in the conveying direction.

The second half-cut scale 74 has a symmetric configuration to the first half-cut scale 73 in the orthogonal direction. A plurality of first line segments 74M, a plurality of characters 74P, a plurality of characters 74N, and a plurality of second line segments 74L of the second half-cut scale 74 correspond respectively to the plurality of first line segments 73M, the plurality of characters 73P, the plurality of characters 73N, and the plurality of second line segments 73L. The line segment arranged at the center in the orthogonal direction of the tape 50 among the plurality of second line segments 74L and the line segment arranged at the center in the orthogonal direction of the tape 50 among the plurality of second line segments 73L of the first half-cut scale 73 overlap each other.

The conveying direction positions of the first line segments corresponding to the characters 73P, 73N, 74P, and 74N which are "0" among the plurality of first line segments 73M and 74M are adjusted so as to coincide with a half-cut position in design at which the second cutting part 18 performs a half-cut at the half-cut timing specified in accordance with the half-cut time Th stored in the flash memory 95.

The first full-cut scale 83 is provided upstream of the first half-cut scale 73 in the conveying direction. The first full-cut scale 83 has the same configuration as that of the first half-cut scale 73. A plurality of first line segments 83M, a plurality of characters 83P, a plurality of characters 83N, and a plurality of second line segments 83L of the first full-cut scale 83 correspond respectively to the plurality of first line segments 73M, the plurality of characters 73P, the plurality of characters 73N, and the plurality of second line segments 73L of the first half-cut scale 73.

The second full-cut scale 84 is provided upstream of the second half-cut scale 74 in the conveying direction. The second full-cut scale 84 has the same configuration as that of the second half-cut scale 74. A plurality of first line segments 84M, a plurality of characters 84P, a plurality of characters 84N, and a plurality of second line segments 84L of the second full-cut scale 84 correspond respectively to the plurality of first line segments 74M, the plurality of characters 74P, the plurality of characters 74N, and the plurality of second line segments 74L of the second half-cut scale 74.

The positional relationship between the plurality of first line segments 83M, the plurality of second line segments 83L of the first full-cut scale 83 and the plurality of first line segments 84M, the plurality of second line segments 84L of the second full-cut scale 84 corresponds to the positional relationship between the plurality of first line segments 73M, the plurality of second line segments 73L of the first half-cut scale 73 and the plurality of first line segments 74M, the plurality of second line segments 74L of the second half-cut scale 74.

The conveying direction positions of the first line segments corresponding to the characters 83P, 83N, 84P, and 84N which are "0" among the plurality of first line segments 83M and 84M are adjusted so as to coincide with a full-cut position in design at which the first cutting part 17 performs a full-cut at the full-cut timing specified in accordance with the full-cut time Tf stored in the flash memory 95.

As illustrated in FIG. 7B, the scale group D4 includes a half-cut scale 7C and a full-cut scale 8C. The half-cut scale 7C has a third half-cut scale 75 and a fourth half-cut scale 76. The full-cut scale SC has a third full-cut scale 85 and a fourth full-cut scale 86.

A plurality of first line segments 75M, a plurality of second line segments 75L, a plurality of characters 75P, and a plurality of characters 75N of the third half-cut scale 75 correspond respectively to the plurality of first line segments 73M, the plurality of second line segments 73L, the plurality of characters 73P, and the plurality of characters 73N of the first half-cut scale 73. A plurality of first line segments 76M, a plurality of second line segments 76L, a plurality of characters 76P, and a plurality of characters 76N of the fourth half-cut scale 76 correspond respectively to the plurality of first line segments 74M, the plurality of second line segments 74L, the plurality of characters 74P, and the plurality of characters 74N of the second half-cut scale 74.

A plurality of first line segments 85M a plurality of second line segments 85L, a plurality of characters 85P, and a plurality of characters 85N of the third full-cut scale 85 correspond respectively to the plurality of first line segments 83M, the plurality of second line segments 83L, the plurality of characters 83P, and the plurality of characters 83N of the first full-cut scale 83. A plurality of first line segments 86M, a plurality of second line segments 86L, a plurality of characters 86P, and a plurality of characters 86N of the fourth full-cut scale 86 correspond respectively to the plurality of first line segments 84M, the plurality of second line segments 84L, the plurality of characters 84P, and the plurality of characters 84N of the second full-cut scale 84.

The half-cut scale 7C of the scale group D4 differs from the half-cut scale 7B of the scale group D3 in that the plurality of the first line segments 75M and 76M are arranged in the conveying direction at equal intervals smaller than those of the plurality of the first line segments 73M and 74M. In other words, the plurality of first line segments 75M and 76M have linewidths smaller than those of the plurality of the first line segments 73M and 74M. Other configurations of the half-cut scale 7C are the same as those of the half-cut scale 7B.

The full-cut scale 8C of the scale group D4 differs from the fun-cut scale 8B of the scale group D3 in that the plurality of the first line segments 85M and 86M are arranged in the conveying direction at equal intervals smaller than those of the plurality of the first line segments 83M and 84M. In other words, the plurality of first line segments 85M and 86M have linewidths smaller than those of the plurality of the first line segments 83M and 84M. Other configurations of the full-cut scale 8C are the same as those of the full-cut scale 8B.

<Second Main Process>

Figure 8:
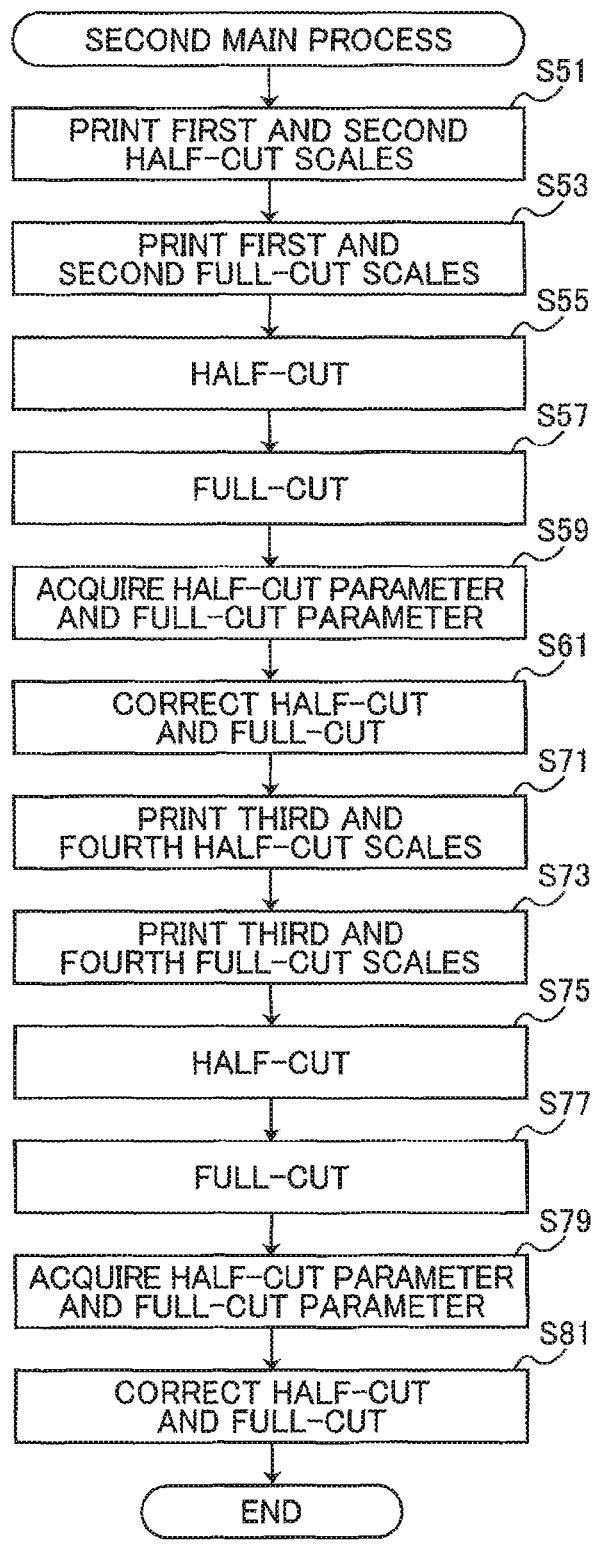
FIG. 8 is a flowchart illustrating a second main process executed by the printing device 1 according to the second embodiment.

With reference to FIG. 8, a second main process executed by the CPU 91 in the second embodiment will be described. When an instruction to start printing is inputted through the keyboard 3, the CPU 91 starts the second main process by reading out and executing a program (i.e., a set of program instructions) stored in the flash memory 95. Hereinafter, description of the process common to the first main process will be simplified. Further, description of the operation under the second operation mode will be omitted.

The CPU 91 starts conveying the tape 50. The CPU 91 prints an object in the print area 50A of the tape 50 at a print timing specified based on the print data stored in the flash memory 95. After completion of the printing of the object on the print area 50A, the CPU 91 prints the half-cut scale 7B (see FIG. 7A) in the margin area 50B (S51) and then prints the full-cut scale 8B (see FIG. 7A) in the margin area 50B at a position upstream relative to the half-cut scale 7B (S53).

When the half-cut timing specified in accordance with the half-cut time Th stored in the flash memory 95 has come after completion of the printing of the object, the CPU 91 half-cuts the tape 50 using the second cutting part 18 (S55). As a result, both the first half-cut scale 73 and second half-cut scale 74 printed on the tape 50 in the process of S51 are half-cut. Subsequently, when the full-cut timing specified in accordance with the full-cut time Tf stored in the flash memory 95 has arrived, the CPU 91 full-cuts the tape 50 using the first cutting part 17 (S57). As a result, both the first full-cut scale 83 and second full-cut scale 84 printed on the tape 50 in the process of S53 are full-cut.

Figure 9A:
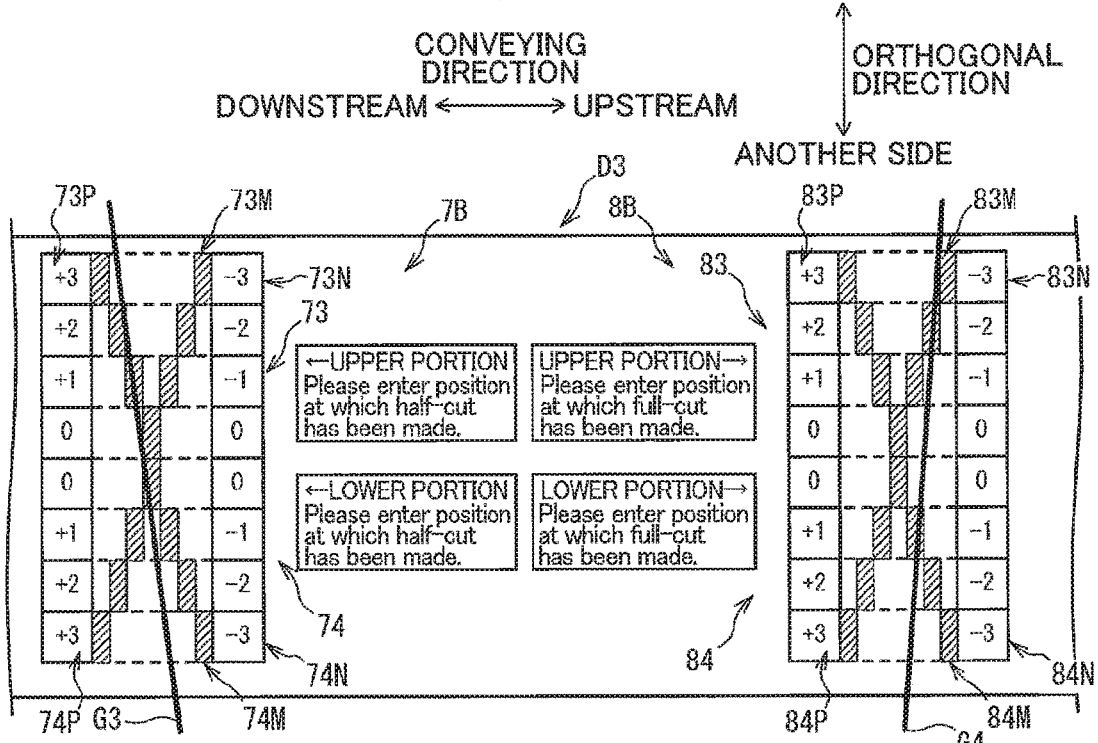
FIG. 9A is a view illustrating a specific example of a case where the tape 50 having the scale group D3 printed thereon has been subjected to a half-cut and full-cut in the printing device 1 according to the second embodiment.

FIG. 9A schematically illustrates the tape 50 that has been subjected to the half-cut and full-cut by the above process. A straight line G3 denotes an example of the second cut position at which the second cutting part 18 performs a half-cut. A straight line G4 denotes an example of the first cut position at which the first cutting part 17 performs a full-cut.

The user identifies, as the first half-cut parameter, the numeral "+1" of the plurality of characters 73P that corresponds to the line segment overlapped with the second cut position among the plurality of first line segments 73M of the first half-cut scale 73 of the tape 50. Further, the user identifies, as the second half-cut parameter, the numeral "0" of the plurality of characters 74P, 74N that corresponds to the line segments overlapped with the second cut position among the plurality of first line segments 74M of the second half-cut scale 74 of the tape 50.

The user identifies, as the first full-cut parameter, the numeral "−2" of the plurality of characters 83N that corresponds to the line segments overlapped with the first cut position among the plurality of first line segments 83M of the first full-cut scale 83 of the tape 50. Further, the user identifies, as the second full-cut parameter, the numeral "−1" of the plurality of characters 84N that corresponds to the line segments overlapped with the first cut position among the plurality of first line segments 84M of the second full-cut scale 84 of the tape 50.

The user inputs the identified half-cut parameter (i.e., the identified first and second half-cut parameters) and full-cut parameter (i.e., the identified first and second full-cut parameters) to the printing device 1 through the keyboard 3. As illustrated in FIG. 8, the CPU 91 of the printing device 1 acquires the inputted half-cut parameter and full-cut parameter (S59).

The CPU 91 determines the average position (hereinafter, referred to as a first half-cut average position) of the second cut position on the basis of the acquired first half-cut parameter and second half-cut parameter. For example, in the example illustrated in FIG. 9A, the CPU 91 calculates the average value of the first half-cut parameter "+1" and the second half-cut parameter "0" to obtain "0.5" (=(+1+0)/2). Then, the CPU 91 determines the conveying direction position corresponding to the average value "0.5" as the first half-cut average position.

The CPU 91 corrects, on the basis of the determined first half-cut average position, the half-cut time Th stored in the flash memory 95 so that the actual half-cut position at which the second cutting part 18 actually half-cuts the tape 50 is made close to the half-cut position in design (i.e., the conveying direction position corresponding to the average value "0") (S61). As a result, the half-cut timing which is a timing when the printing device 1 performs next half-cut of the tape 50 using the second cutting part 18 is adjusted. Hereinafter, a value obtained by dividing an amount of correction of the half-cut time Th in the above process by the average value of the first and second half-cut parameters is referred to as a first half-cut unit correction amount.

Similarly, the CPU 91 determines, on the basis of the acquired first full-cut parameter and second full-cut parameter, the average position (hereinafter, referred to as a first full-cut average position) of the first cut position. For example, in the example illustrated in FIG. 9A, the CPU 91 calculates the average value of the first full-cut parameter "−2" and the second full-cut parameter "−1" to obtain "−1.5" (=(−2−1)/2). Then, the CPU 91 determines the conveying direction position corresponding to the average value "−1.5" as the first full-cut average position.

The CPU 91 corrects, on the basis of the determined first full-cut average position, the full-cut time Tf stored in the flash memory 95 so that the actual full-cut position at which the first cutting part 17 actually full-cuts the tape 50 is made close to the full-cut position in design (i.e., the conveying direction position corresponding to the average value "0") (S61). As a result, the full-cut timing which is a timing when the printing device 1 performs next full-cut of the tape 50 using the first cutting part 17 is adjusted. Hereinafter, a value obtained by dividing an amount of correction of the full-cut time Tf in the above process by the average value of the first and second full-cut parameters is referred to as a first full-cut unit correction amount.

The CPU 91 resumes conveying the tape 50. The CPU 91 prints an object in the print area 50A of the tape 50 at a print timing specified based on the print data stored in the flash memory 95. After completion of the printing of the object on the print area 50A of the tape 50, the CPU 91 prints the half-cut scale 7C (see FIG. 7B) in the margin area 50B (S71) and then prints the full-cut scale 8C (see FIG. 7B) in the margin area 50B at a position upstream relative to the half-cut scale 7C (S73).

When the half-cut timing specified in accordance with the half-cut time Th corrected in the process of S61 has come after completion of the printing the object, the CPU 91 half-cuts the tape 50 using the second cutting part 18 (S75). As a result, both the third half-cut scale 75 and the fourth half-cut scale 76 (see FIG. 7B) printed on the tape 50 in the process of S71 are half-cut. Then, when the full-cut timing specified in accordance with the full-cut time Tf corrected in the process of S61 has come, the CPU 91 full-cuts the tape 50 using the first cutting part 17 (S77). As a result, both the third full-cut scale 85 and the fourth full-cut scale 86 (see FIG. 7B) printed on the tape 50 in the process of S73 are full-cut.

Figure 9B:
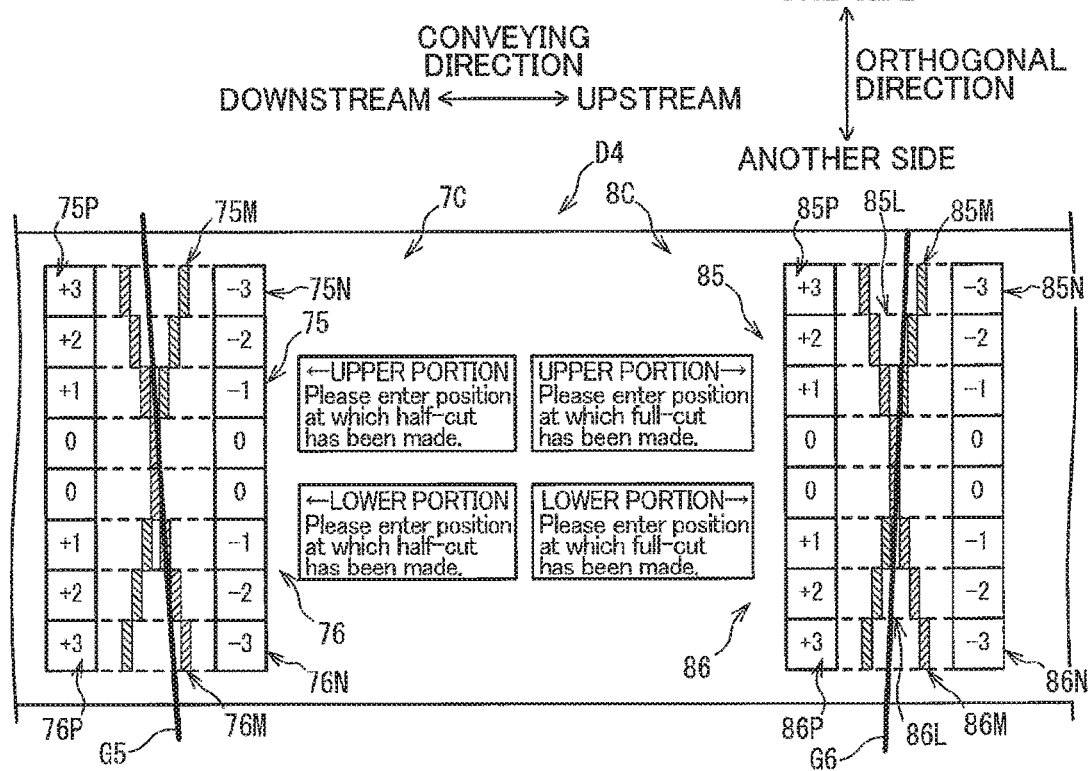
FIG. 9B is a view illustrating a specific example of a case where the tape 50 having the scale group D4 printed thereon has been subjected to a half-cut and full-cut in the printing device 1 according to the second embodiment.

FIG. 9B schematically illustrates the tape 50 that has been subjected to the half-cut and full-cut by the above process. A straight line G5 denotes an example of the second cut position at which the second cutting part 18 performs a half cut. A straight line G6 denotes an example of the first cut position at which the first cutting part 17 performs a full-cut.

The user identifies, as a third half-cut parameter, the numeral "0" of the plurality of characters 75P and 75N that corresponds to the line segments overlapped with the second cut position among the plurality of first line segments 75M of the third half-cut scale 75 of the tape 50. Further, the user identifies, as a fourth half-cut parameter, the numeral "−1" of the plurality of characters 76N that corresponds to the line segment overlapped with the second cut position among the plurality of first line segments 76M of the fourth half-cut scale 76 of the tape 50.

Further, the user identifies, as a third full-cut parameter, the numeral "−1" of the plurality of characters 85N that corresponds to the line segment overlapped with the first cut position among the plurality of first line segments 85M of the third full-cut scale 85 of the tape 50. Further, the user identifies, as a fourth full-cut parameter, the numeral "0" of the plurality of characters 86P and 86N that corresponds to the line segments overlapped with the first cut position among the plurality of first line segments 86M of the fourth full-cut scale 86 of the tape 50.

The user inputs the identified half-cut parameter (i.e., the identified third and fourth half-cut parameters) and full-cut parameter (i.e., the identified third and fourth full-cut parameters) to the printing device 1 through the keyboard 3. As illustrated in FIG. 8, the CPU 91 of the printing device 1 acquires the input half-cut parameter and full-cut parameter (S79).

The CPU 91 determines, on the basis of the acquired third half-cut parameter and fourth half-cut parameter, the average position (hereinafter, referred to as a second half-cut average position) of the second cut position. For example, in the example illustrated in FIG. 9B, the CPU 91 calculates the average value of the third half-cut parameter "0" and the fourth half-cut parameter "−1" to obtain "−0.5" (=(0−1)/2). Then, the CPU 91 determines the conveying direction position corresponding to the average value "−0.5" as the second half-cut average position.

The CPU 91 again corrects, on the basis of the determined second half-cut average position, the half-cut time Th stored in the flash memory 95 so that the actual half-cut position at which the second cutting part 18 actually half-cuts the tape 50 is made more close to the half-cut position in design (i.e., the conveying direction position corresponding to the average value "0") (S81). As a result, the half-cut timing which is a timing when the printing device 1 performs next half-cut of the tape 50 using the second cutting part 18 is adjusted again. Hereinafter, a value obtained by dividing an amount of correcting again the half-cut time Th in the above process by the average value of the third and fourth half-cut parameters is referred to as a second half-cut unit correction amount.

Similarly, the CPU 91 determines, on the basis of the acquired third full-cut parameter and fourth full-cut parameter, the average position (hereinafter, referred to as a second full-cut average position) of the first cut position. For example, in the example illustrated in FIG. 9B, the CPU 91 calculates the average value of the third full-cut parameter "−1" and the fourth full-cut parameter "0" to obtain "−0.5" (=(−1+0)/2). Then, the CPU 91 determines the conveying direction position corresponding to the average value "−0.5" as the second full-cut average position.

The CPU 91 again corrects, on the basis of the determined second full-cut average position, the full-cut time Tf stored in the flash memory 95 so that the actual full-cut position at which the second cutting part 17 actually full-cuts the tape 50 is made more close to the full-cut position in design (i.e., the conveying direction position corresponding to the average value "0") (S81). As a result, the full-cut timing which is a timing when the printing device 1 performs next full-cut of the tape 50 using the first cutting part 17 is adjusted again. The CPU 91 then ends the second main process. Hereinafter, a value obtained by dividing an amount of correcting again the full-cut time Tf in the above process by the average value of the third and fourth full-cut parameters is referred to as a second full-cut unit correction amount.

The second half-cut unit correction amount in S81 is smaller than the first half-cut unit correction amount in S61. The reason is that the plurality of the first line segments 75M and 76M (see FIGS. 7A, 7B and 9A, 9B) of the half-cut scale 7C are arranged in the conveying direction at equal intervals that are smaller than those of the plurality of the first line segments 73M and 74M (see FIGS. 7A, 7B and 9A, 9B) of the half-cut scale 7B. In this case, even when the average value based on the half-cut parameters is the same, a deviation amount of the second half-cut average position from the half-cut position in design at which the second cutting part 18 performs a half-cut is smaller than a deviation amount of the first half-cut average position from the half-cut position.

Similarly, the second full-cut unit correction amount in S81 is smaller than the first full-cut unit correction amount in S61. The reason is that the plurality of the first line segments 85M and 86M (see FIGS. 7A, 7B and 9A, 9B) of the full-cut scale 8C are arranged in the conveying direction at equal intervals that are smaller than those of the plurality of the first line segments 83M and 84M (see FIGS. 7A, 7B and 9A, 9B) of the full-cut scale 8B. In this case, even when the average value based on the full-cut parameters is the same, a deviation amount of the second full-cut average position from the full-cut position in design at which the first cutting part 17 performs a full-cut is smaller than a deviation amount of the first full-cut average position from the full-cut position in design.

<Functions and Effects of Second Embodiment>

The plurality of first line segments 73M, 74M, 83M, and 84M of the scale group D3 are arranged at equal intervals not only in the conveying direction, but also in the orthogonal direction. Thus, even when the plurality of first line segments 73M, 74M, 83M, and 84M are made wide, neighboring two first line segments thereof can be clearly distinguished from each other. This allows the printing device 1 to facilitate user's selection of the first line segments overlapped with the cut position among the plurality of first line segments 73M, 74M, 83M, and 84M and to improve the accuracy of the user's selection.

The printing device 1 adjusts again (S81), on the basis of the half-cut scale 7C and the full-cut scale 8C, the half-cut timing and full-cut timing that have been adjusted on the basis of the half-cut scale 7B and the full-cut scale 8B. Thus, the printing device 1 can make the cut position in design and the actual cut position coincide with each other more accurately.

<Remarks of Second Embodiment>

The half-cut scale 7B and full-cut scale 8B of the scale group D3 and the half-cut scale 7C and full-cut scale 8C of the scale group D4 each may have the plurality of first line segments having the same configuration as in the first embodiment. In this case, the interval in the conveying direction between neighboring two of the plurality of first line segments included in the half-cut scale 7C and full-cut scale 8C may be made smaller than the interval in the conveying direction between neighboring two of the plurality of first line segments in the conveying direction included in the half-cut scale 7B and full-cut scale 8B.

The values represented by each of the plurality of characters 75P, 75N, 76P, 76N, 85P, 85N, 86P, 86N included in the scale group D4 may be "0", "+0.5", "+1.0", "+1.5" or "0", "−0.5", "−1.0", "−1.5" from the center in the conveying direction toward the one side or the other side in the orthogonal direction.

Third Embodiment

Nest, a third embodiment of the present disclosure will be described with reference to FIGS. 10 and 11, wherein structures and components similar to those in the printing devices 1 according to the above-described embodiments are designated with the same reference numerals to avoid duplicating description. The following description will focus on structures, components, and control that differ from those of the printing devices 1 according to the above-described embodiments.

FIG. 10 illustrates a scale group D5 that the printing device 1 operating in the first operation mode in the third embodiment prints on the tape 50. The scale group D5 includes a half-cut scale 7E (first half-cut scale 77, second half-cut scale 78) and a full-cut scale 8E (first full-cut scale 87, second full-cut scale 88). The scale group D5 differs from the scale group D3 (see FIG. 7A) in that a plurality of dots 73D, 74D, 83D, and 84D are arranged in place of the plurality of first line segments 73M, 74M, 83M, and 84M (see FIG. 7A). The plurality of dots 73D, 74D, 83D, and 84D each have a solid circular shape. Other configurations of the scale group D5 are the same as those of the scale group D3, so description thereof will be omitted with the same reference numerals as for the scale group D3 given thereto.

In the third embodiment, a method of adjusting the half-cut timing and full-cut timing using the scale group D5 printed on the tape 50 is as follows.

The process until the half-cut parameter and full-cut parameter identified by the user are inputted through the keyboard 3 and then the CPU 91 acquires them is the same as that of S11 to S23 (see FIG. 5) of the first main process and S51 to S59 (see FIG. 8) of the second main process. As illustrated in FIG. 10, for example, it is assumed that the second cut position denoted by a straight line G7 is half-cut by the second cutting part 18, and that the first cut position denoted by a straight line G8 is full-cut by the first cutting part 17. In this case, the CPU 91 acquires "+3" as the first half-cut parameter, "+1" as the second half-cut parameter, "+1" as the first full-cut parameter, and "+2" as the second full-cut parameter.

As illustrated in FIG. 11, the CPU 91 specifies a coordinate system in which an axis extending in the conveying direction and passing through the center of the tape 50 in the orthogonal direction is set as the x-axis, and an axis extending in the orthogonal direction and passing through the conveying direction center dots of the plurality of dots 73D and 74D is set as the y-axis. The CPU 91 specifics, as the second cut position at which the second cutting part 18 performs a half-cut, coordinate information indicating the positions of two dots 73D corresponding respectively to the first half-cut parameter "+3" and second half-cut parameter "+1".

The CPU 91 specifies the inclination and intercept of a virtual line passing through the two dots 73D on the basis of the specified coordinate information, and derives the linear equation of the virtual line in the specified xy coordinate system. The CPU 91 further specifies the position of a point P1 at which the virtual line represented by the derived linear equation intersects the x-axis.

The CPU 91 corrects, on the basis of the determined point P1, the half-cut time Th stored in the flash memory 95 so that the second cutting part 18 half-cuts the tape 50 at the half-cut position in design (i.e., at the origin of the specified xy coordinate system) (S23 (see FIG. 5), S61 (see FIG. 8)). As a result, the half-cut timing which is a timing when the printing device 1 performs next half-cut of the tape 50 using the second cutting part 18 is adjusted.

The adjustment method for the full-cut timing is the same as that for the half-cut timing, so description thereof will be omitted.

<Functions and Effects of Third Embodiment>

The printing device 1 adjusts the half-cut timing on the basis of the position of the intersection of the x-axis and the virtual line which connects the cut position on the first half-cut scale 77 corresponding to the first half-cut parameter and the cut position on the second half-cut scale 78 corresponding to the second half-cut parameter. Similarly, the printing device 1 adjusts the full-cut timing on the basis of the position of the intersection of the x-axis and the virtual line which connects the cut position on the first full-cut scale 87 corresponding to the first full-cut parameter and the cut position on the second full-cut scale 88 corresponding to the second full-cut parameter. Thus, an adequate cut position considering the inclinations of the first and second cut positions with respect to the orthogonal direction can be specified more accurately.

<Remarks of Third Embodiment>

For example, the CPU 91 may derive the position of the intersection P1 of the x-axis and the virtual line connecting the cut positions on the first half-cut scale 77 and the second half-cut scale 78 on the basis of the following expression, where C1 is the first half-cut parameter to be acquired, C2 is the second half-cut parameter to be acquired, and X is a parameter indicating the position of the point P1 in the x-axis direction:

$$X=(C1-C2)/(C1+C2)\times C2+C2$$

In this case, the CPU 91 determines, as the average position of the second cut position, the conveying direction position corresponding to the position of X to be calculated. The average position of the first cut position can be derived in the similar manner.

What is claimed is:

1. A printing device comprising:
a conveying part configured to convey a printing medium in a conveying direction;
a printing part configured to print on the printing medium at a print timing;
a cutting part provided downstream of the printing part in the conveying direction, the cutting part being configured to cut the printing medium, which has been conveyed by the conveying part, at a cut timing after the printing part prints on the printing medium;

a memory storing a set of program instructions; and
a controller configured to execute the set of program instructions stored in the memory, the set of program instructions, when executed by the controller, causing the controller to perform:
printing, by controlling the printing part, a first scale and a second scale on the printing medium,
wherein at least a portion of the printed first scale and at least a portion of the printed second scale are arranged at the same position in the conveying direction,
wherein the printed first scale and the printed second scale are arranged at different positions in an orthogonal direction orthogonal to the conveying direction;
cutting, by controlling the cutting part, the printed first scale and the printed second scale on the printing medium at the cut timing after the printing part prints on the printing medium; and
acquiring two parameters corresponding to a cut position at which the cutting part cuts the printing medium in the cutting, one of the two parameters being a first parameter corresponding to the cut position on the printed first scale, another of the two parameters being a second parameter corresponding to the cut position on the printed second scale.

2. The printing device according to claim 1, wherein the set of program instructions, when executed by the controller, causes the controller to further perform:
adjusting, on the basis of the acquired first parameter and the acquired second parameter, at least one of a target print timing and a target cut timing, the target print timing being a timing to be used as the print timing when next printing on the printing medium, the target cut timing being a timing to be used as the cut timing when next cutting the printing medium.

3. The printing device according to claim 2, wherein, in the adjusting, the controller adjusts the at least one of the target print timing and the target cut timing on the basis of an average position of:
the cut position on the printed first scale corresponding to the acquired first parameter; and
the cut position on the printed second scale corresponding to the acquired second parameter.

4. The printing device according to claim 2, wherein, in the adjusting, the controller adjusts the at least one of the target print timing and the target cut timing on the basis of a line segment connecting:
the cut position on the printed first scale corresponding to the acquired first parameter; and
the cut position on the printed second scale corresponding to the acquired second parameter.

5. The printing device according to claim 1, wherein each of the first scale and the second scale includes a plurality of line segments arranged at equal intervals in the conveying direction.

6. The printing device according to claim 5, wherein the plurality of line segments are arranged at equal intervals also in the orthogonal direction.

7. The printing device according to claim 5, wherein the first scale further includes a first positive numeral value and a first negative numeral value which are arranged in the vicinity of the plurality of line segments, and
wherein the second scale further includes a second positive numeral value and a second negative numeral value which are arranged in the vicinity of the plurality of line segments.

8. The printing device according to claim 2, wherein the cutting part comprises:

a first cutting part configured to full-cut the printing medium at a full-cut timing; and
a second cutting part configured to half-cut the printing medium at a half-cut timing,
wherein the first scale includes:
a first full-cut scale corresponding to the first cutting part; and
a first half-cut scale corresponding to the second cutting part,
wherein the second scale includes:
a second full-cut scale corresponding to the first cutting part; and
a second half-cut scale corresponding to the second cutting part,
wherein, the printing comprises:
printing the first full-cut scale and the second full-cut scale on the printing medium; and
printing the first half-cut scale and the second half-cut scale on the printing medium,
wherein the controller performs the cutting after performing the printing the first scale and the second scale, and
wherein the cutting comprises:
full-cutting, by controlling the first cutting part, both the printed first full-cut scale and the printed second full-cut scale at the full-cut timing; and
half-cutting, by controlling the second cutting part, both the printed first half-cut scale and the printed second half-cut scale at the half-cut timing.

9. The printing device according to claim 8, wherein the acquiring comprises:
acquiring two full-cut parameters corresponding to a first cut position at which the first cutting part full-cuts the printing medium in the full-cutting, one of the two full-cut parameters being a first full-cut parameter corresponding to the first cut position on the printed first full-cut scale, another of the two full-cut parameters being a second full-cut parameter corresponding to the first cut position on the printed second full-cut scale; and
acquiring two half-cut parameters corresponding to a second cut position at which the second cutting part half-cuts the printing medium in the half-cutting, one of the two half-cut parameters being a first half-cut parameter corresponding to the second cut position on the printed first half-cut scale, another of the two half-cut parameters being a second half-cut parameter corresponding to the second cut position on the printed second half-cut scale, and
wherein the adjusting comprises:
adjusting, on the basis of the acquired first full-cut parameter and the acquired second full-cut parameter, at least one of the target print timing and a target full-cut timing, the target full-cut timing being a timing to be used as the full-cut timing when next full-cutting the printing medium; and
adjusting, on the basis of the acquired first half-cut parameter and the acquired second half-cut parameter, at least one of the target print timing and a target half-cut timing, the target half-cut timing being a timing to be used as the half-cut timing when next half-cutting the printing medium.

10. The printing device according to claim 8, wherein, in the printing the first scale and the second scale, the controller first performs the printing the first half-cut scale and the second half-cut scale and then performs the printing the first full-cut scale and the second full-cut scale.

11. The printing device according to claim 8, wherein the set of program instructions, when executed by the controller, causes the controller to further perform:
receiving a setting for an operation mode of the printing device,
wherein, on the basis of the setting received in the receiving, the controller operates under one of a first operation mode and a second operation mode,
wherein, when the controller operates under the first operation mode:
in the printing the first scale and the second scale, the controller performs both the printing the first full-cut scale and the second full-cut scale and the printing the first half-cut scale and the second half-cut scale; and
in the cutting, the controller performs both the full-cutting and the half-cutting, and
wherein, when the controller operates under the second operation mode:
in the printing the first scale and the second scale, the controller performs the printing the first half-cut scale and the second half-cut scale and does not perform the printing the first full-cut scale and the second full-cut scale; and
in the cutting, the controller performs the half-cutting and does not perform the full-cutting.

12. The printing device according to claim 1, wherein the controller controls the printing part to:
print on a predetermined area of the printing medium; and
print the first scale and the second scale on a margin area of the printing medium in the printing, the margin area being a different area from the predetermined area.

13. The printing device according to claim 2, wherein each of the first scale and the second scale includes a plurality of line segments arranged in the conveying direction at equal intervals, and
wherein the set of program instructions, when executed by the controller, causes the controller to further perform:
after performing the adjusting, printing, by controlling the printing part, a third scale and a fourth scale on the printing medium, the third scale including a plurality of line segments arranged in the conveying direction at equal intervals that are smaller than those of the plurality of line segments of the first scale, the fourth scale including a plurality of line segments arranged in the conveying direction at equal intervals that are smaller than those of the plurality of line segments of the second scale;
after performing the printing the third scale and the fourth scale, cutting, by controlling the cutting part, both the printed third scale and the printed fourth scale on the printing medium at the target cut timing adjusted in the adjusting;
acquiring two parameters corresponding to a cut position at which the cutting part cuts the printing medium in the cutting both the printed third scale and the printed fourth scale, one of the two parameters being a third parameter corresponding to the cut position on the printed third scale, another of the two parameters being a fourth parameter corresponding to the cut position on the printed fourth scale; and
again adjusting, on the basis of the acquired third parameter and the acquired fourth parameter, the target cut timing adjusted in the adjusting the at least one of the target print timing and the target cut timing.

* * * * *